United States Patent
Sederberg et al.

(10) Patent No.: US 7,578,461 B2
(45) Date of Patent: *Aug. 25, 2009

(54) LUBRICATING SYSTEM FOR MATERIAL-PROCESSING SHEARS

(75) Inventors: Clayton P. Sederberg, Duluth, MN (US); Michael W. Swanson, Two Harbors, MN (US)

(73) Assignee: The Stanley Works, New Britain, CT (US)

( * ) Notice: Subject to any disclaimer, the term of this patent is extended or adjusted under 35 U.S.C. 154(b) by 336 days.

This patent is subject to a terminal disclaimer.

(21) Appl. No.: 11/159,408

(22) Filed: Jun. 23, 2005

(65) Prior Publication Data

US 2006/0005395 A1   Jan. 12, 2006

Related U.S. Application Data

(63) Continuation-in-part of application No. 11/068,041, filed on Mar. 1, 2005, now Pat. No. 7,487,930, and a continuation-in-part of application No. 10/886,052, filed on Jul. 8, 2004, now Pat. No. 7,240,869.

(51) Int. Cl.
  *B02C 19/00*   (2006.01)
  *B02C 23/02*   (2006.01)
(52) U.S. Cl. .................. 241/101.73; 241/266
(58) Field of Classification Search ............ 241/101.73, 241/266
  See application file for complete search history.

(56) References Cited

U.S. PATENT DOCUMENTS

| | | | |
|---|---|---|---|
| 4,384,599 A | 5/1983 | Dagenais | |
| 4,462,439 A | 7/1984 | Dagenais | |
| 4,558,515 A | 12/1985 | LaBounty | |
| 4,771,540 A | 9/1988 | LaBounty | |
| 4,903,408 A | 2/1990 | Tagawa et al. | |
| 5,113,733 A | 5/1992 | Peterson et al. | |

(Continued)

FOREIGN PATENT DOCUMENTS

EP   0353363   2/1990

OTHER PUBLICATIONS

"HTL 429 Pump and Electric FlowMaster © Pump", Solutions, The Latest Products and News for Lincoln Customers, Apr. 2003, vol. 5, No. 2, pp. 1-2.

(Continued)

*Primary Examiner*—Faye Francis
(74) *Attorney, Agent, or Firm*—Pillsbury Winthrop Shaw Pittman LLP

(57) ABSTRACT

A lubricating system for a heavy-duty material processing shears provides lubricant to one or more wear surfaces on one or more wear portions in the shears. The system includes a hydraulic lubricant pump that is actuated by the main hydraulic control system by means of which the jaws of the shears are opened and closed, and may include a sequential valve to distribute lubricant to various wear portions in sequential fashion. The lubricating system may lubricate one or more wear surfaces of the lateral blade stabilizers, primary and secondary blade(s) on the upper and/or lower jaws, pivotal connections between jaws and/or between the upper jaw and the hydraulic cylinder, a forward wear plate, or any other wear portion of the shears. The lubricating system may be retrofitted onto a conventional non-lubricated shears by replacing a conventional upper jaw with an upper jaw with lubricant conduits and a lubricating system.

42 Claims, 27 Drawing Sheets

U.S. PATENT DOCUMENTS

| | | | |
|---|---|---|---|
| 5,127,567 | A | 7/1992 | LaBounty et al. |
| 5,230,151 | A | 7/1993 | Kunzman et al. |
| 5,384,962 | A | 1/1995 | Pemberton |
| 5,715,603 | A | 2/1998 | Dorguin |
| 5,769,341 | A | 6/1998 | Morikawa et al. |
| 5,992,023 | A | 11/1999 | Sederberg et al. |
| 6,061,911 | A | 5/2000 | LaBounty et al. |
| 6,119,970 | A | 9/2000 | LaBounty et al. |
| 7,240,869 | B2 * | 7/2007 | Sederberg et al. ...... 241/101.73 |

OTHER PUBLICATIONS

"Construction's Best Lubrication Solutions", Capabilities, Information From the Leader in the Lubrication Industry, pp. 3-10.

"Vogel Centralized Lubrication", www.vogelag.com, Feb. 2004.

"Hydralube Lubrication Pump", Interlube, Leaders in Lubrication Solutions.

"Light Hydraulic Breakers", AtlasCopco, pp. 3-7.

HP Series Hydraulic Breakers, Indeco, Your Partners in Demolition.

"Pulverizers Range", Indeco, Your Partners in Demolition.

"360 Degrees Lubricating Grease System and Fitted with Semi-Self Lubricating Bushes", A-Ward Attachments, www.a-ward.co.nz/pdfs/Re-barShear17/Feb05v1.pdf.

"Hydraulic Auto Lube Pump Installation, Operation, & Maintenance Manual", Stanley, Form 44869, May 2001, pp. 1-12.

* cited by examiner

LUBRICATING SYSTEM FOR MATERIAL-PROCESSING SHEARS

CROSS-REFERENCE

This application is a continuation-in-part of co-pending application Ser. No. 10/886,052, now U.S. Pat. No. 7,240,869, entitled "LUBRICATING SYSTEM FOR METAL-DEMOLITION SHEARS," filed Jul. 8, 2004, and 11/068,041, "LUBRICATING SYSTEM FOR METAL-DEMOLITION SHEARS," filed Mar. 1, 2005, now U.S. Pat. No. 7,487,930 the contents of which are incorporated herein by reference in their entirety.

FIELD OF THE INVENTION

The invention relates to heavy-duty machinery having wear parts with wear surfaces that need to be lubricated. More particularly, the invention relates to heavy-duty mobile shears and demolition attachments such as shear attachments and multi-jaw processors used in concrete and steel processing and demolition.

BACKGROUND OF THE INVENTION

As illustrated in FIGS. 1 and 2, in general, a heavy-duty metal demolition shears 10 of the sort in which a lubricating system according to the invention may be incorporated has a stationary lower jaw 12 and an upper jaw 14 that pivots about a pivot structure 16 to open and close. A hydraulic cylinder 18 drives the upper jaw 14 to open and close the shears 10. The shears 10 includes upper primary and secondary blade insert members 20 and 22, respectively, attached to seating surfaces on the upper jaw 14, and lower primary and secondary blade insert members 24 and 26, respectively, attached to seating surfaces on the right-hand lower jaw side plate 12b. The blade insert members 20-26 cooperate to cut material being processed with the shears 10 in shearing fashion. The lower jaw includes two sides and an end plate. The blade side is often referred to as the "cutting side," the opposite side, with the guide blade, is often referred to as the "guide side," and the end plate is often referred to as the "cross plate."

As the shears cut a workpiece, the upper jaw 14 may be deflected somewhat laterally due to the fact that the lines along which cutting forces are applied to a workpiece by the lower and upper jaws 12, 14 are slightly offset with respect to each other. Therefore, a heavy-duty demolition shears may include a wear guide or guide blade 28 attached to a seating surface formed along a slot-facing surface of the left-hand (guide side) lower jaw side plate 12a and a wear plate 30 that is attached to a lateral surface of a front or nose portion of the upper jaw.

Additionally, it is known in the art to provide one or more lateral blade stabilizers (not included in the prior art shears illustrated in FIGS. 1 and 2) that are positioned on either side of the upper jaw, generally near the pivot structure.

As the shears 10 operates, these various wear components, which present various wear surfaces, slide past each other—blade insert members past blade insert members, the wear plate past the guide blade, and the upper jaw past the lateral blade stabilizers. As they do so, they can wear each other down. Accordingly, it is known to lubricate the various wear surfaces that make sliding contact with each other. Traditionally, such lubrication has been done manually. That, however, necessitates stopping operation of the shears, which reduces productivity.

BRIEF SUMMARY OF THE INVENTION

One or more embodiments of the present invention provides a system that delivers lubricant to a wear surface on a shears through a lubricant pumping system that is integrated into the shears.

One or more embodiments of the present invention provides a material processing system that includes a first jaw, a second jaw operatively connected to the first jaw, a powered actuator that enables relative movement between the first and second jaws, and a first shearing wear portion disposed on one of the first and second jaws. The first shearing wear portion has a first shearing wear surface. The system also includes a lubricant conduit carried by the system. The lubricant conduit has a first end positioned to supply lubricant to the first shearing wear surface when lubricant flows out of the first end of the lubricant conduit.

According to a further aspect of one or more of these embodiments, the first shearing wear surface is generally planar. The first shearing wear surface may be configured to intermittently contact material being processed during operation of the material processing system.

According to a further aspect of one or more of these embodiments, the system includes a lubricant supply that fluidly connects to the lubricant conduit to provide lubricant to the first shearing wear surface.

According to a further aspect of one or more of these embodiments, the first shearing wear surface is disposed on the first jaw, the first end of the lubricant conduit moves relative to the first jaw when the first jaw moves relative to the second jaw, and the first end faces the first shearing wear surface.

According to a further aspect of one or more of these embodiments, the powered actuator includes a hydraulic cylinder pivotally connected to one of the jaws.

According to a further aspect of one or more of these embodiments, the first shearing wear portion comprises a blade on one of the jaws.

According to a further aspect of one or more of these embodiments, the first end of the lubricant output conduit comprises a lubricant port disposed in the first shearing wear surface. The first shearing wear portion may comprise a blade on one of the jaws. The blade may comprise a blade insert member removably mounted to the one of the jaws. The system may also include a groove in the one of the jaws, wherein the blade insert member encloses the groove to form a fluid conduit, and wherein the fluid conduit defines a portion of the lubricant conduit.

According to a further aspect of one or more of these embodiments, the system includes a blade insert member removably mounted to the first jaw. The blade insert member has a second wear surface. The first shearing wear surface comprises a surface of the first jaw adjacent to the second wear surface. The first and second wear surfaces may be generally coplanar to each other.

According to a further aspect of one or more of these embodiments, the system includes a second shearing wear portion having a second shearing wear surface. The first and second shearing wear surfaces are configured to move relative to each other in a shearing relationship as the second jaw moves relative to the first jaw during operation of the system. The first and second wear surfaces may remain spaced from each other as they move by each other.

According to a further aspect of one or more of these embodiments, the system includes at least one additional wear surface disposed on the system. The lubricant conduit includes a lubricant distributor valve that is configured to distribute lubricant to the first shearing wear surface and the at least one additional wear surface. The lubricant distributor valve may distribute lubricant to the first shearing wear surface and the at least one additional wear surface in sequential fashion.

According to a further aspect of one or more of these embodiments, the system includes a second wear portion having a second wear surface. The first shearing wear portion is disposed on the first jaw. The second wear portion is disposed on the second jaw. The lubricant conduit includes a second end that is positioned to supply lubricant to the second wear surface.

According to a further aspect of one or more of these embodiments, the system includes a powered lubricant pump operatively connected to the lubricant conduit and the lubricant supply to pump lubricant from the lubricant supply to the first end of the lubricant conduit. The lubricant conduit may include a lubricant distributor valve. The system may include a second wear portion having a second wear surface. The lubricant conduit may include a second end that is positioned to supply lubricant to the second wear surface when lubricant flows through the second end of the lubricant conduit. The lubricant distributor valve may distribute lubricant from the pump to the first and second ends of the lubricant conduit. The first and second ends of the lubricant conduit may be positioned to supply lubricant to different ones of: a portion of the operative connection between the first and second jaws, a portion of a movable connection between one of the jaws and the powered actuator, a lateral wear portion on one of the jaws that is configured to transfer lateral loads to a lateral blade stabilizer mounted to the other jaw, or a blade on one of the jaws.

According to a further aspect of one or more of these embodiments, the system comprises a shears body, the first and second jaws are operatively connected to the body, the lubricant pump is disposed within the body, the powered actuator moves the first jaw relative to the body, and the lubricant conduit comprises a flexible line that extends from the pump into the first jaw.

According to a further aspect of one or more of these embodiments, the first jaw comprises a piercing tip portion having a forward wear surface, the second jaw comprises a forward cross-member having an inner wear surface, and the first shearing wear surface is defined by one of the forward wear surface and the inner wear surface.

According to a further aspect of one or more of these embodiments, the second jaw comprises a lateral blade stabilizer, the first jaw comprises a lateral wear portion that is configured to transfer lateral loads to the lateral blade stabilizer when the first jaw is laterally deflected toward the lateral blade stabilizer, and the first shearing wear surface is disposed on one of the lateral wear portion and the lateral blade stabilizer.

One or more embodiments of the present invention may provide a material processing system that includes a first jaw and a second jaw pivotally connected to the first jaw. The system includes a powered actuator that enables relative movement between the first and second jaws. The system includes a first lateral stabilizing wear portion disposed on the first jaw. The first lateral stabilizing wear portion has a first lateral stabilizing wear surface that is spaced from the pivotal connection between the jaws. The system includes a lubricant conduit carried by the system. The lubricant conduit has a first end positioned to supply lubricant to the lateral stabilizing wear surface when lubricant flows out of the first end of the lubricant conduit. The system may also include a second lateral stabilizing wear portion disposed on the second jaw. The second lateral stabilizing wear portion has a second lateral stabilizing wear surface. The first lateral stabilizing wear portion is configured to transfer lateral loads to the second lateral stabilizing wear portion when the first jaw is laterally deflected toward the second lateral stabilizing wear portion during material processing.

One or more embodiments of the present invention may provide a material processing shears that includes a first jaw and a second jaw, said first and second jaws being connected for relative movement therebetween. The shears includes a shearing wear surface on the first jaw. The shears includes a lubricant conduit carried at least in part by the first jaw and having an outlet arranged to eject lubricant onto the wear surface.

One or more embodiments of the present invention may provide a material processing shears that includes a first jaw pivotally connected to a second jaw. The shears includes a lateral stabilizing wear surface on the first jaw. The lateral stabilizing wear surface is spaced from the pivotal connection between the jaws. The shears includes a lubricant conduit carried at least in part by the first jaw. The lubricant conduit has an outlet arranged to eject lubricant onto the lateral stabilizing wear surface.

One or more embodiments of the present invention may provide a wear plate for use in a material processing shears having a jaw with a seating surface against which the wear plate is configured to be seated. The wear plate includes a body having a securing region that enables the wear plate to be secured in an operative position to the jaw. The body has a shearing wear surface. The wear plate also includes a lubricant conduit disposed in the body for directing lubricant to the shearing wear surface. The lubricant conduit is positioned to mate with a corresponding lubricant supply conduit of the jaw.

According to a further aspect of one or more of these embodiments, the wear plate includes a lubricant dispersion groove formed along the shearing wear surface and fluidly connected to the lubricant conduit. The lubricant conduit may include a bore that extends through the body. The lubricant conduit may include a groove in the body. The wear plate may be a blade insert member. The wear plate may include a forward cross-member, wherein the shearing wear surface is disposed on an inner surface of the forward cross-member. The securing region may include a bolt hole. The lubricant conduit may extend through the bolt hole.

According to a further aspect of one or more of these embodiments, the wear plate is incorporated into a material processing shears that includes a first jaw having a seating surface against which the wear plate is seated, a second jaw operatively connected to the first jaw, a powered actuator that enables relative movement between the first and second jaws, and a lubricant supply conduit disposed in the first jaw and fluidly connected to the lubricant conduit of the wear plate. The shears may also include a lubricant supply fluidly connected to the lubricant supply conduit to provide lubricant to the shearing wear surface.

According to a further aspect of one or more of these embodiments, the wear plate is a lateral wear plate having the wear surface disposed on a lateral surface of the wear plate. The wear plate may include a piercing tip that is configured such that it can be rotated by 180° about a central, transverse axis and reseated against the seating surface of the jaw. The shearing wear surface may be disposed on a forward surface or a lateral surface of the piercing tip.

One or more embodiments of the present invention provides a method of lubricating a material processing shears. The shears include a first jaw movably connected to a second jaw. One of the jaws has a wear surface. The shears include a powered actuator that movably drives one of the jaws relative to the other of the jaws. The method includes applying lubricant to the wear surface via a lubricant conduit carried by the shears. The lubricant conduit may include a lubricant port disposed in the wear surface. The lubricant conduit may extend to the wear surface from within the shears. The lubricant conduit includes a first end that is positioned to supply lubricant to the wear surface when lubricant flows through the lubricant conduit. According to a further aspect of one or more of these embodiments, the method further includes supplying lubricant to the lubricant conduit via a powered lubricant pump. The powered actuator may include a hydraulic cylinder, and the method may further include powering the powered lubricant pump by operating the hydraulic cylinder.

One or more embodiments of the present invention provides a method of making a lubricated demolition system. The method includes movably connecting a first jaw to a second jaw. The first jaw comprises a first shearing wear portion having a first shearing wear surface. The method also includes mounting a lubricant conduit to one of the jaws such that a first end of the lubricant conduit is positioned to supply lubricant to the first shearing wear surface. The lubricant conduit has a second end fluidly connected to the first end. The method further includes fluidly connecting a lubricant pump to the second end of the lubricant conduit such that operation of the lubricant pump pumps lubricant through the lubricant conduit and onto the first shearing wear surface. The method may further include detaching a third jaw from the second jaw prior to movably connecting the first jaw to the second jaw.

Additional and/or alternative advantages and salient features of the invention will become apparent from the following detailed description, which, taken in conjunction with the annexed drawings, disclose embodiments of the invention.

BRIEF DESCRIPTION OF THE DRAWINGS

These and other features of the invention will be described in greater detail below in connection with the FIGURES, in which.

DETAILED DESCRIPTION OF EMBODIMENTS OF THE INVENTION

Figure 1:
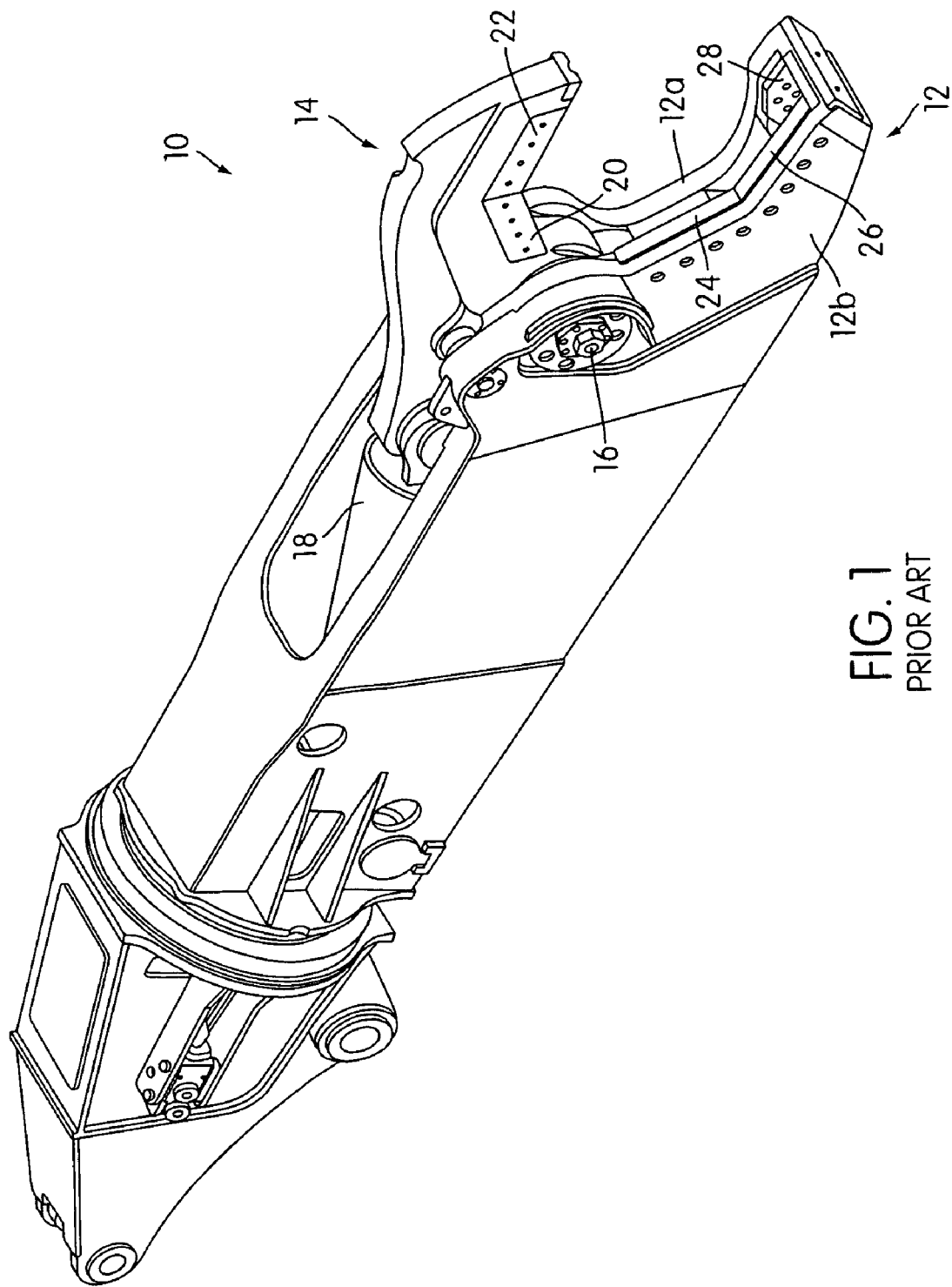
FIGS. 1 and 2 are perspective views from the right and left side, respectively, of a heavy-duty metal demolition shears according to the invention.
Figure 2:
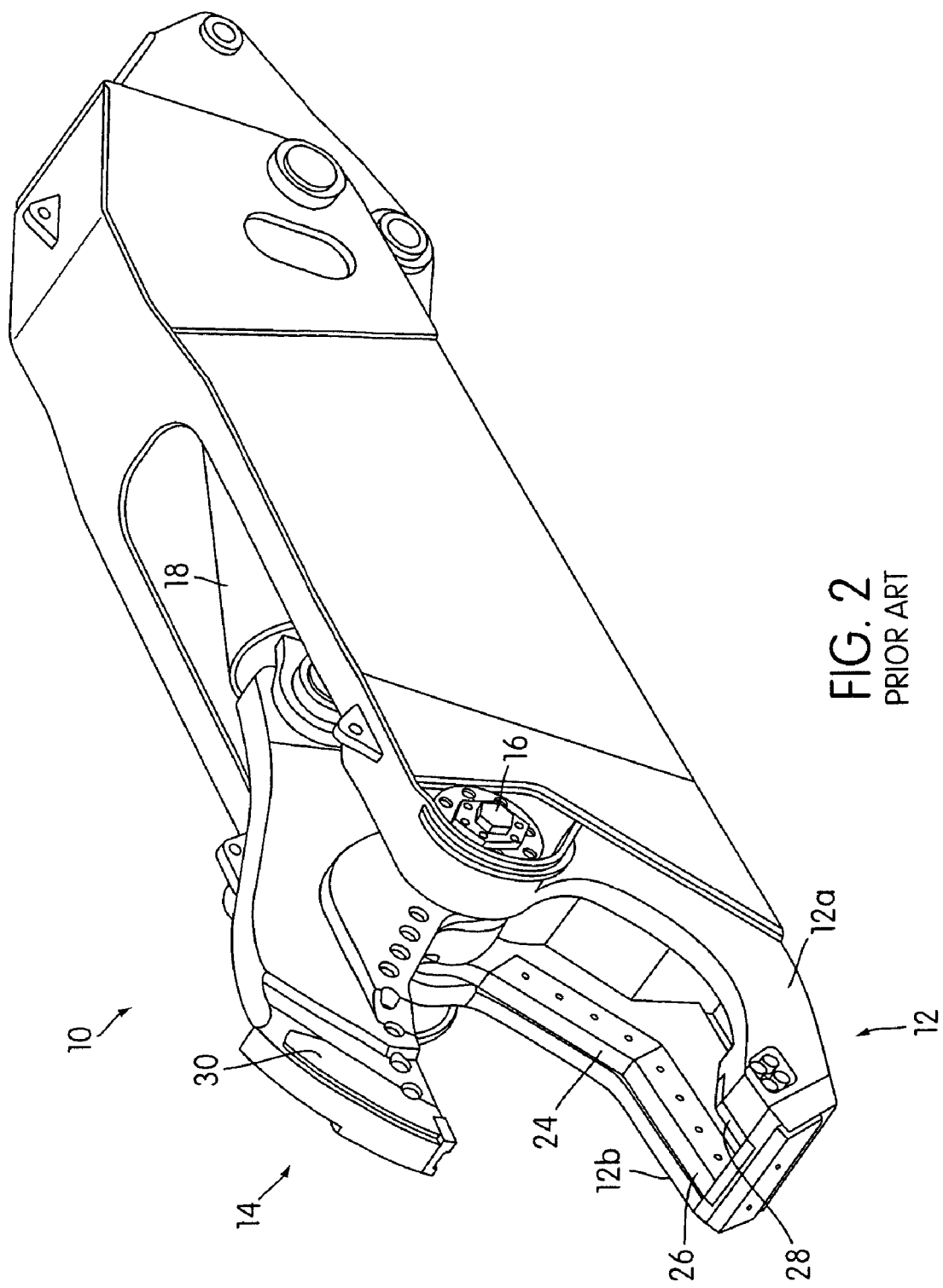
Figure 3:
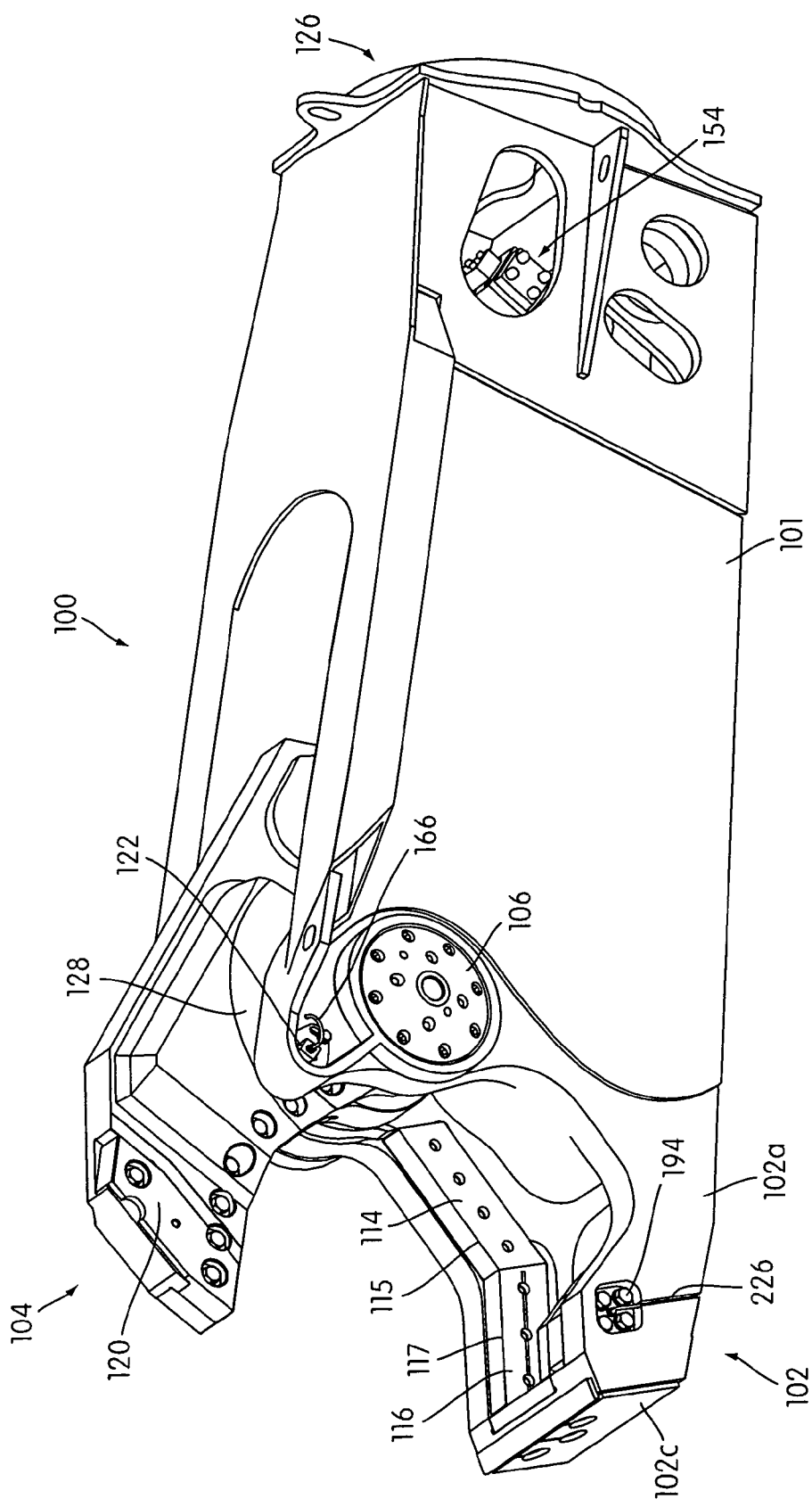
FIGS. 3-6 are perspective views illustrating a heavy-duty metal demolition shears incorporating a lubricating system according to the invention, with FIGS. 3 and 4 showing the shears open and FIGS. 5 and 6 showing the shears closed.

A metal demolition shears 100 that incorporates an embodiment of a lubricating system according to the invention is illustrated generally in FIGS. 3-6. The metal demolition shears 100 may be attached to a base machine such as an excavator. The shears 100 has lower jaws 102 and upper jaws 104 that is pivotally connected to the lower jaws 102 by means of pivot structure 106. Alternatively, the connection between the jaws 102, 104 could comprise any other suitable movable connection (e.g., linear or curvilinear sliding path, etc.). The movable connection may involve a direct connection between the jaws 102, 104 or an indirect connection between the jaws via intermediate parts (e.g., if the jaws 102, 104 are disposed on opposite legs of a four bar linkage). The lower jaw 102 includes left-hand lower jaw plate 102a, right-hand lower jaw plate 102b, and cross-member 102c interconnecting the two. The upper jaw 104 is driven to pivot open and closed relative to the lower jaw 102 by means of a hydraulic cylinder 108 (illustrated schematically in FIG. 10) or other suitable powered actuator (e.g., linear electric actuator, electric motor, hydraulic motor, etc.).

Upper primary and secondary blade insert members 110, 112, respectively, are secured to a blade seat portion of the upper jaw 104 and provide primary and secondary upper cutting edges 111, 113, respectively. Similarly, lower primary and secondary blade insert members 114, 116, respectively, are secured to seating surfaces formed along the right-hand lower jaw side plate 102b and provide primary and secondary lower cutting edges 115, 117, respectively.

A wear guide or guide blade 118 is attached to an inner, slot-facing seat formed along left-hand side plate 102a opposing the lower primary and secondary blade insert members, and a wear plate 120 is attached to a lateral surface at a front, nose portion of the upper jaw 104. The wear plate 120 may be configured as described in greater detail in co-pending U.S. application Ser. No. 10/697,554, entitled "METAL DEMOLITION SHEARS WITH INDEXABLE, INTEGRATED WEAR PLATE/PIERCING TIP" and filed on Oct. 31, 2003, the contents of which are incorporated by reference.

The shears 100 also includes a left-hand lateral blade stabilizer 122 and a right-hand lateral blade stabilizer 124. For the illustrated configuration, where primary shearing action occurs between the upper jaw 104 and the right-hand lower jaw plate 102b, the left-hand lateral blade stabilizer 122 is located above and forward of the pivot structure 106 (forward being taken to mean in a generally longitudinal direction, from the rear mounting adaptor portion of the shears 126 toward the jaws 102 and 104), and the right-hand lateral blade stabilizer 124 is located generally above and slightly behind the central axis of the pivot structure 106. As the upper jaw 104 pivots open and closed, depending on lateral forces on the upper jaw 104, the left-hand lateral blade stabilizer 122 will make sliding contact along an arcuate portion 128 on the left side of the upper jaw 104, and the right-hand lateral blade stabilizer 124 will make sliding contact along the surface of arcuate wear member 130, which may be formed as a distinct stand-off extending laterally from the surface of the upper jaw.

Figure 4:
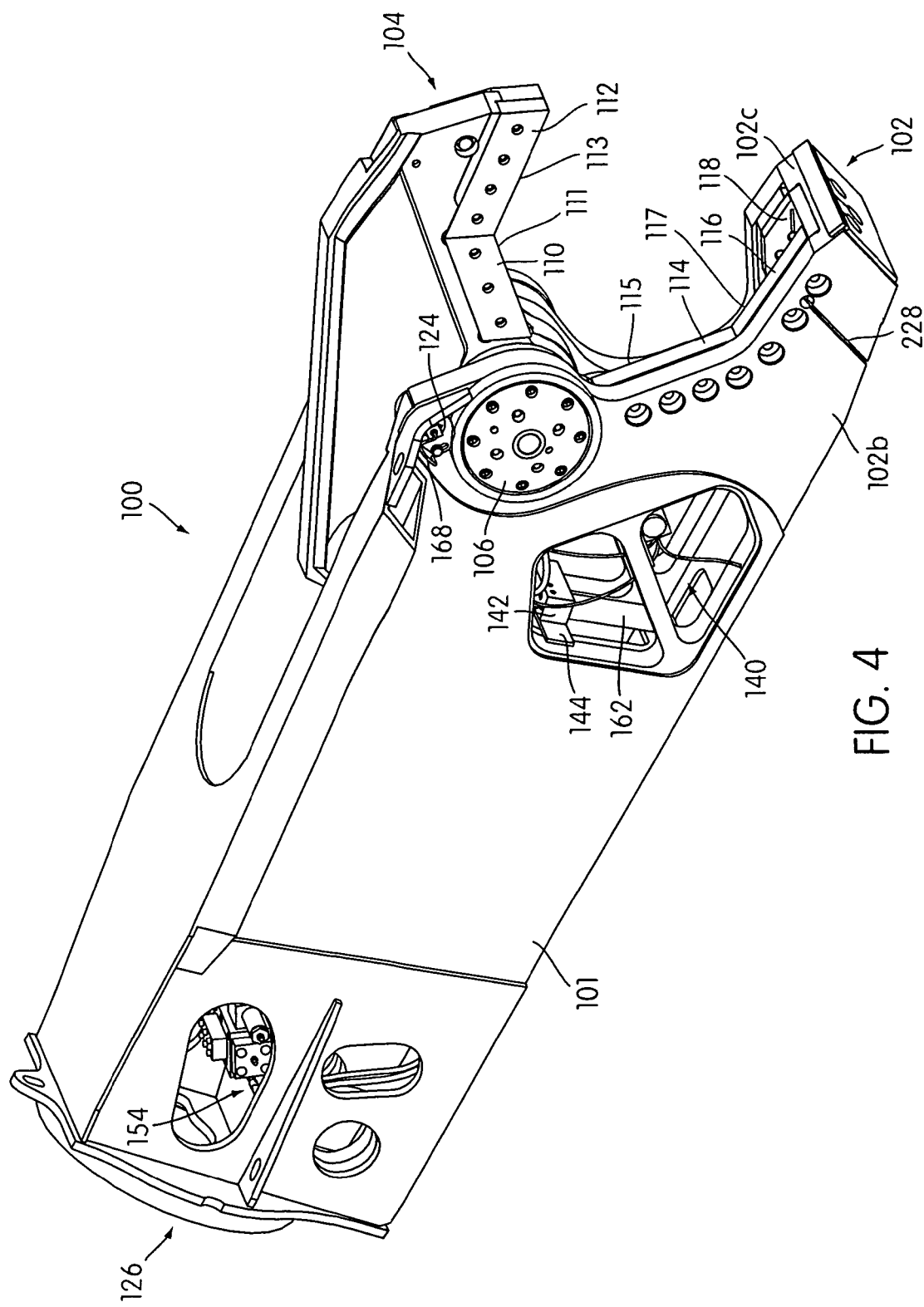
Figure 5:
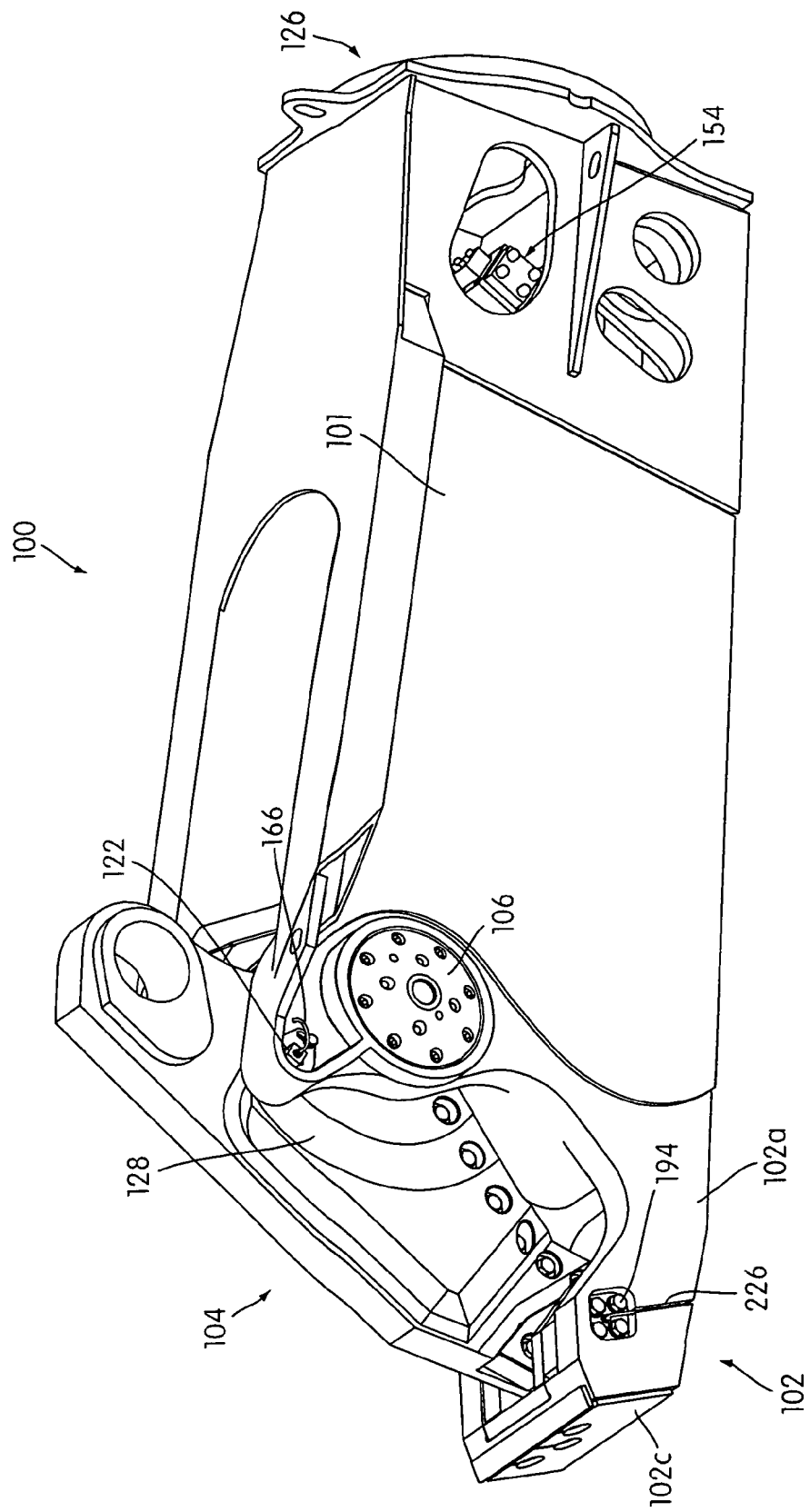
Figure 6:
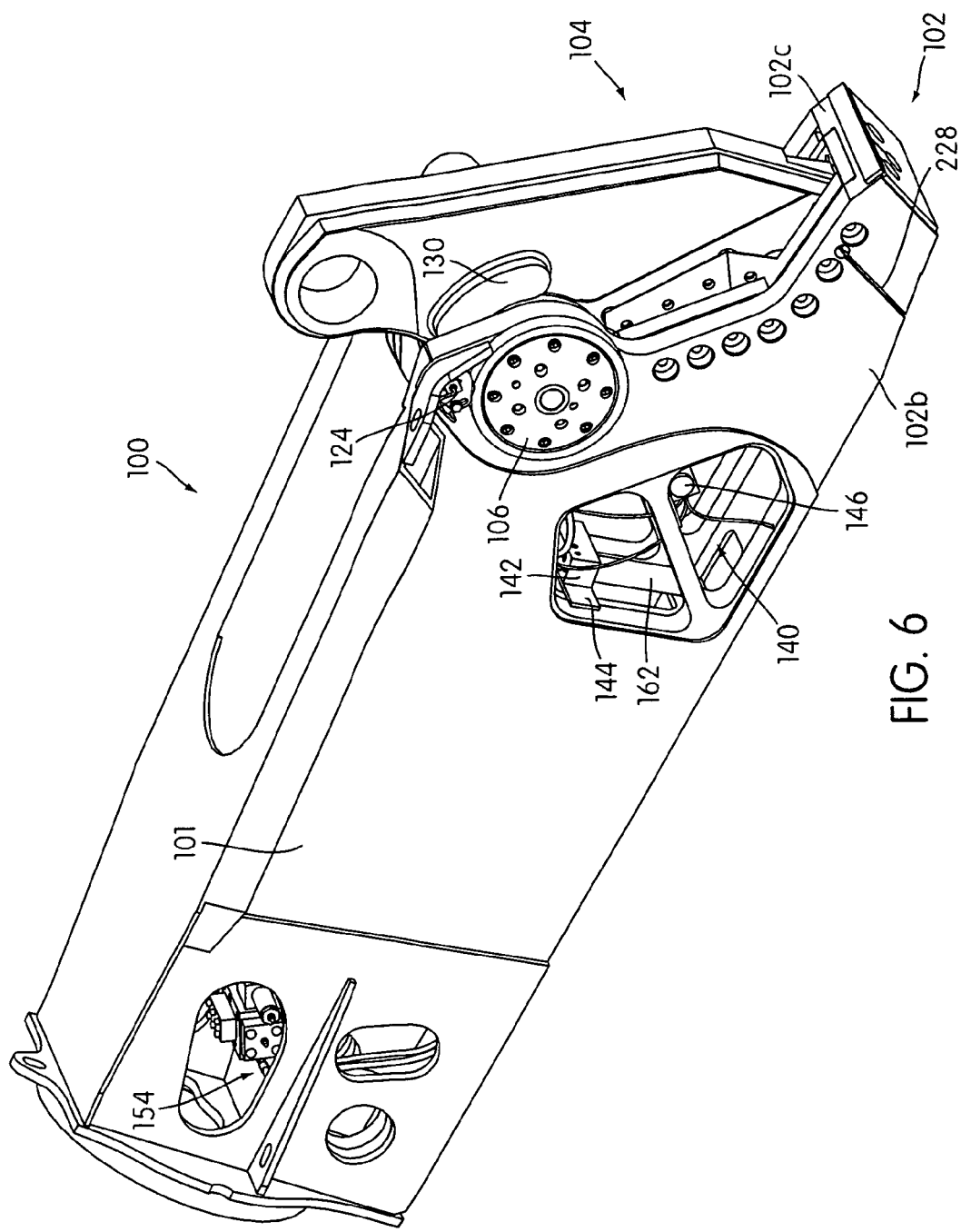

As is visible in FIGS. 4 and 6, and as illustrated in greater detail in FIGS. 7-10, a lubricating system 140 is provided and supplies grease or other lubricant to one or more of the various wear parts. In the illustrated embodiment, the lubricating system provides lubricant to the guide blade 118, lower secondary cutting blade insert member 116, and left-hand and right-hand lateral blade stabilizers 122 and 124, but it is not necessary to supply lubricant to all such wear parts for a lubricating system to fall within the scope of the invention.

The lubricating system 140 includes a hydraulic lubricant pump 142 (e.g., a grease pump) that is supported within the generally box-form body of the shears "stick" structure 101, e.g., by means of a mounting bracket 144 used to secure the hydraulic lubricant pump 142 to an appropriate mounting point. The lubricating system 140 may include an SSV valve (sequential lubricant distributor) 146 that distributes grease or other lubricant to each of the various wear parts in sequential fashion. The SSV valve 146 is also mounted, e.g., by means of a mounting bracket 148, to an appropriate mounting point within the shears stick structure 101. The hydraulic lubricant pump 142 may, for example, be a model HTL429 Hydraulic Tool Lubricator, available from Stanley Hydraulic Tools or Lincoln Industrial Corporation, that is customarily used to lubricate the bushings of the tool bit in hydraulic hammers. Alternatively, it can be any other hydraulically actuated grease or lubricant pump. Moreover, the pump 142 may comprise any other type of suitable pump (e.g., electric-motor-driven pump, pneumatic pump, linear-actuator-driven pump, etc.) without deviating from the scope of the present invention. The SSV valve 146 may be a Divider Valve available from Lincoln Industrial.

In the illustrated embodiment, the lubricant pump 142 is disposed within the shears 100. However, the lubricant pump 142 may alternatively be mounted to any other suitable structure (e.g., outside of the shears structure 101, in or on the upper jaws 104, external to the shears 100, on a base machine such as an excavator, etc.). If the pump 142 is disposed external to the shears 100, a suitable fluid line extends from the pump 142 to the shears 100 along any suitable part of the base machine (e.g., along a boom). If the shears 100 mount to a base machine for relative rotational movement, the connecting fluid line may include a swivel joint disposed at the center of the rotational joint. If relative rotational movement between the shears 100 and the base machine is limited, the fluid line, itself, may be flexible enough to accommodate such rotational movement without the use of a swivel joint.

Figure 9:
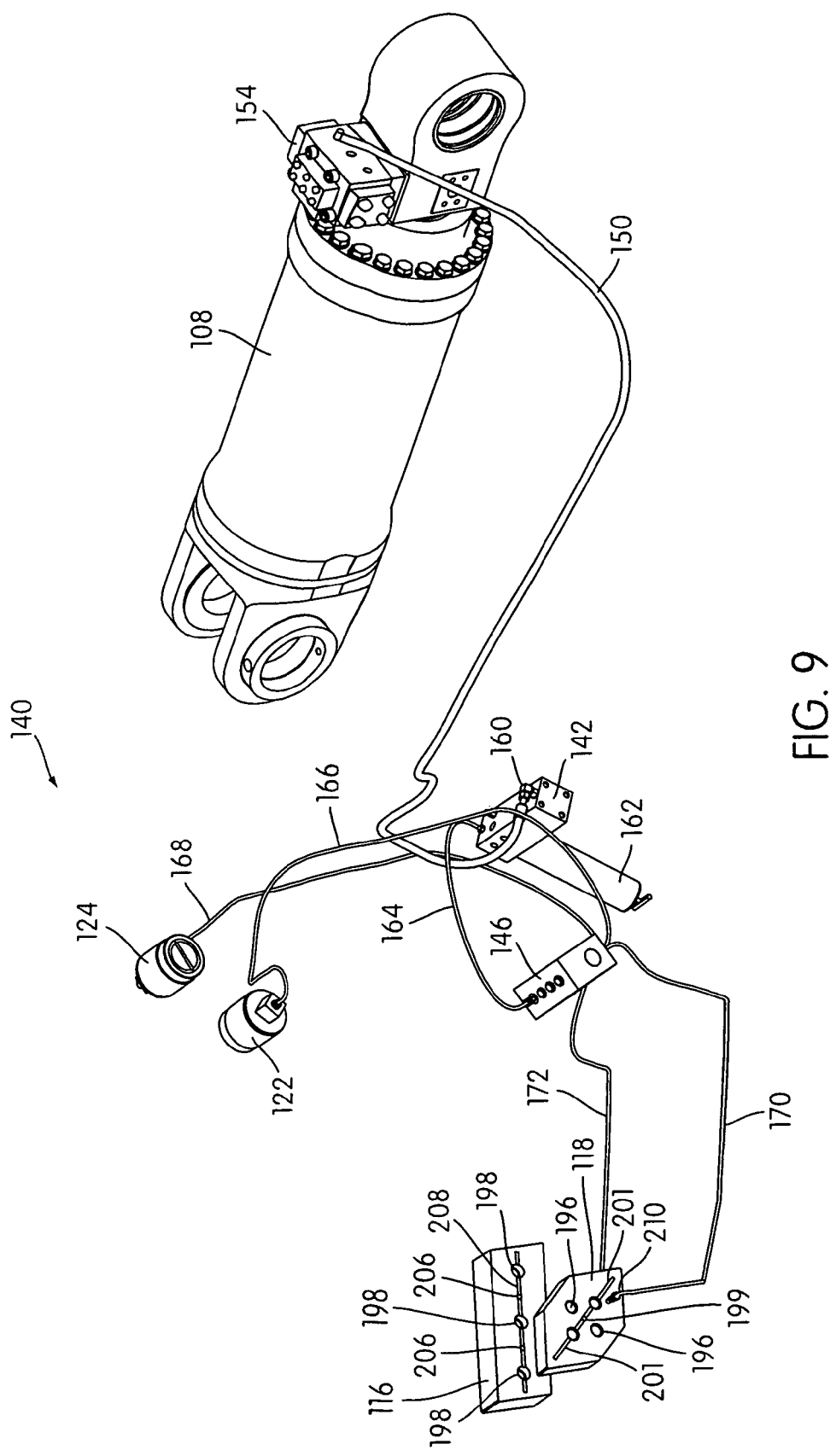
FIG. 9 is a perspective view illustrating just a lubricating system for use in a heavy-duty metal demolition shears as per the invention, along with various possible wear parts to which the lubricating system may be used to apply lubricant.
Figure 10:
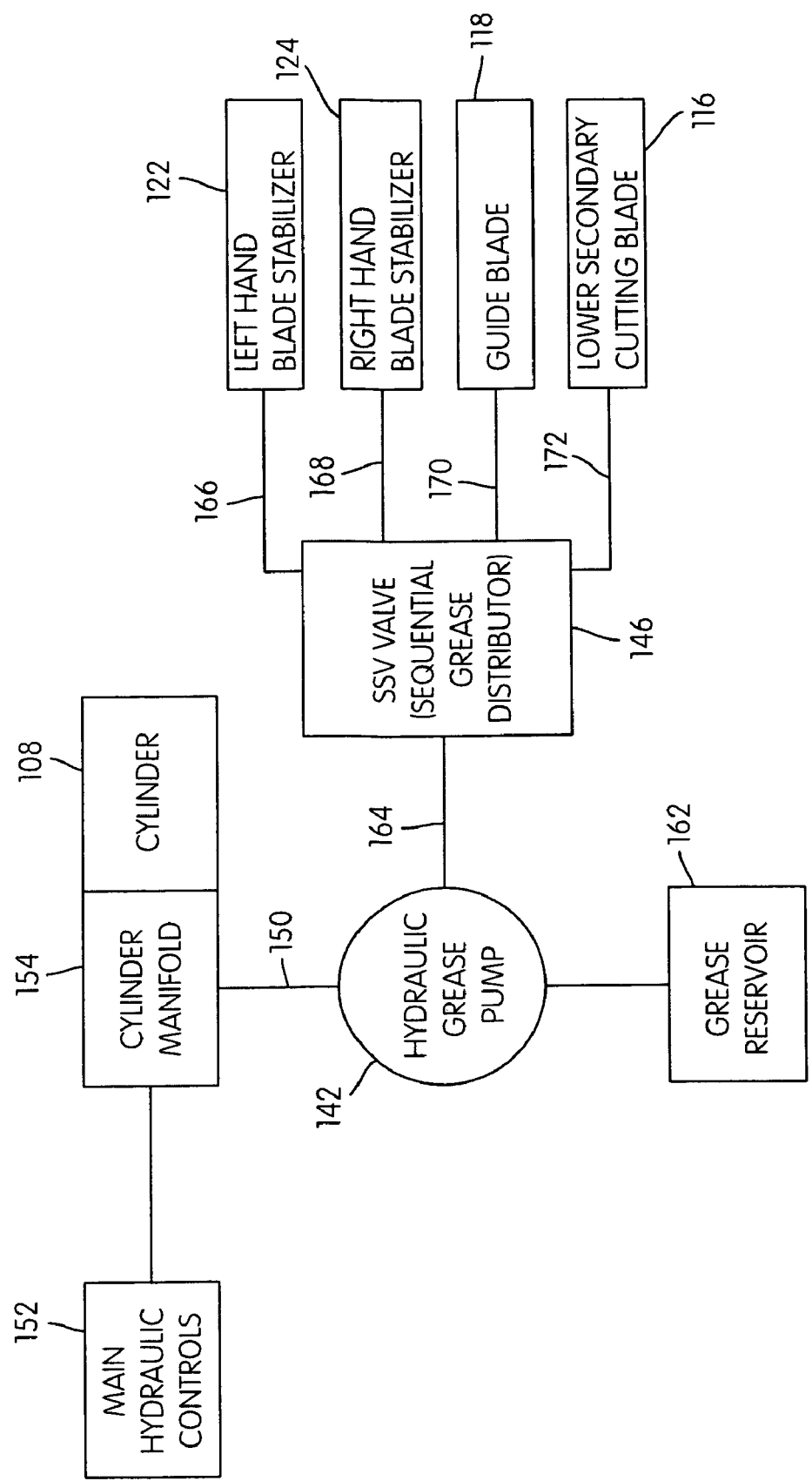
FIG. 10 is a schematic representation of the lubricating system and wear parts as illustrated in FIG. 9.

As illustrated in FIGS. 9 and 10, operation of the hydraulic lubricant pump 142 is controlled by a hydraulic control line 150. The hydraulic control line receives hydraulic fluid from hydraulic cylinder 108 manifold 154, operation of which is regulated by main hydraulic controls unit 152. The hydraulic control line 150 is connected to the hydraulic lubricant pump 142, e.g., at hydraulic coupling 160. A supply of lubricant is provided to the hydraulic lubricant pump 142 by means of a reservoir 162 such as a grease cartridge, molded lubricant reservoir, or other suitable lubricant supply. The hydraulic lubricant pump 142 is configured such that each time the hydraulic control line 150 is pressurized, the hydraulic pump pumps a metered amount of lubricant, supplied by the reservoir 162, out along primary lubricant output line 164.

The illustrated lubricant pump 142 is automatically controlled and powered by the actuation of the cylinder 108. Alternatively, the lubricant pump 142 may be manually controlled by the user of the machine and/or powered by alternative power source (e.g., pressurized hydraulic fluid source, electricity, etc.). For example, a manually-operated electrical switch may operatively connect to an electric pump 142 that provides lubricant to the lubricant output line 164. Alternatively, a hand or foot pedal on the base machine may operate a valve that provides pressurized hydraulic fluid to the pump 142 via the line 150. The pump 142 and/or reservoir 162 may be located on the base machine or on any suitable portion of the shears 100.

Alternatively, the lubricant pump 142 may comprise a pressurized lubricant reservoir. The reservoir may be pressurized via an appropriate associated spring/piston system, compressed gas system, etc. The wear parts are lubricated by opening a valve disposed in a fluid line between the pump 142 and the lubricated wear part. The valve may be operated automatically by the cylinder 108 or manually by the user of the shears 100. Any other actuation mechanism for the valve may alternatively be used without deviating from the scope of the present invention (e.g., timed lubrication, lubrication each time the base machine is turned on or off, etc.).

If only a single wear part is to be lubricated, the primary lubricant output line 164 may lead directly to a lubricant injection point configured to lubricate that wear part. Where multiple wear parts are to be lubricated, however, the primary lubricant output line 164 feeds lubricant to the SSV valve (sequential grease distributor) 146. The SSV valve 146 then feeds lubricant sequentially, with each cycle of operation of the pump 142, to the various individual lubricant output lines 166, 168, 170, and 172. As illustrated in FIGS. 9 and 10, the individual lubricant output lines 166, 168, 170, and 172 supply lubricant to the left-hand lateral blade stabilizer, the right-hand lateral blade stabilizer, the lower secondary cutting blade insert member 116, and the guide blade 118, respectively.

Further details of the various wear parts configured for use in a heavy-duty metal demolition shears that may be lubricated by means of a lubricating system according to embodiments disclosed in connection with FIGS. 11-19.

Figure 11:
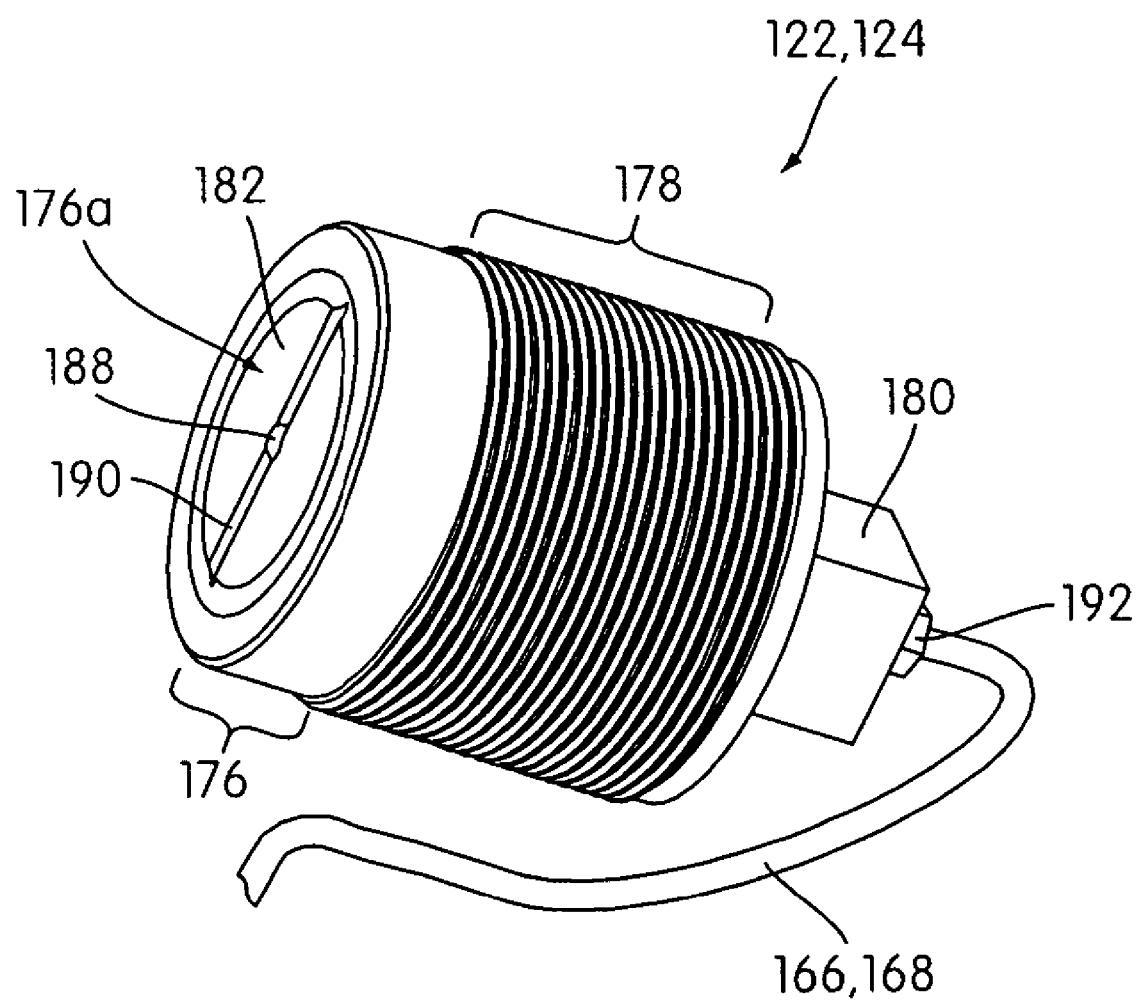
FIG. 11 is a perspective view illustrating a lateral blade stabilizer configured for use with a lubricating system according to the invention.
Figure 12:
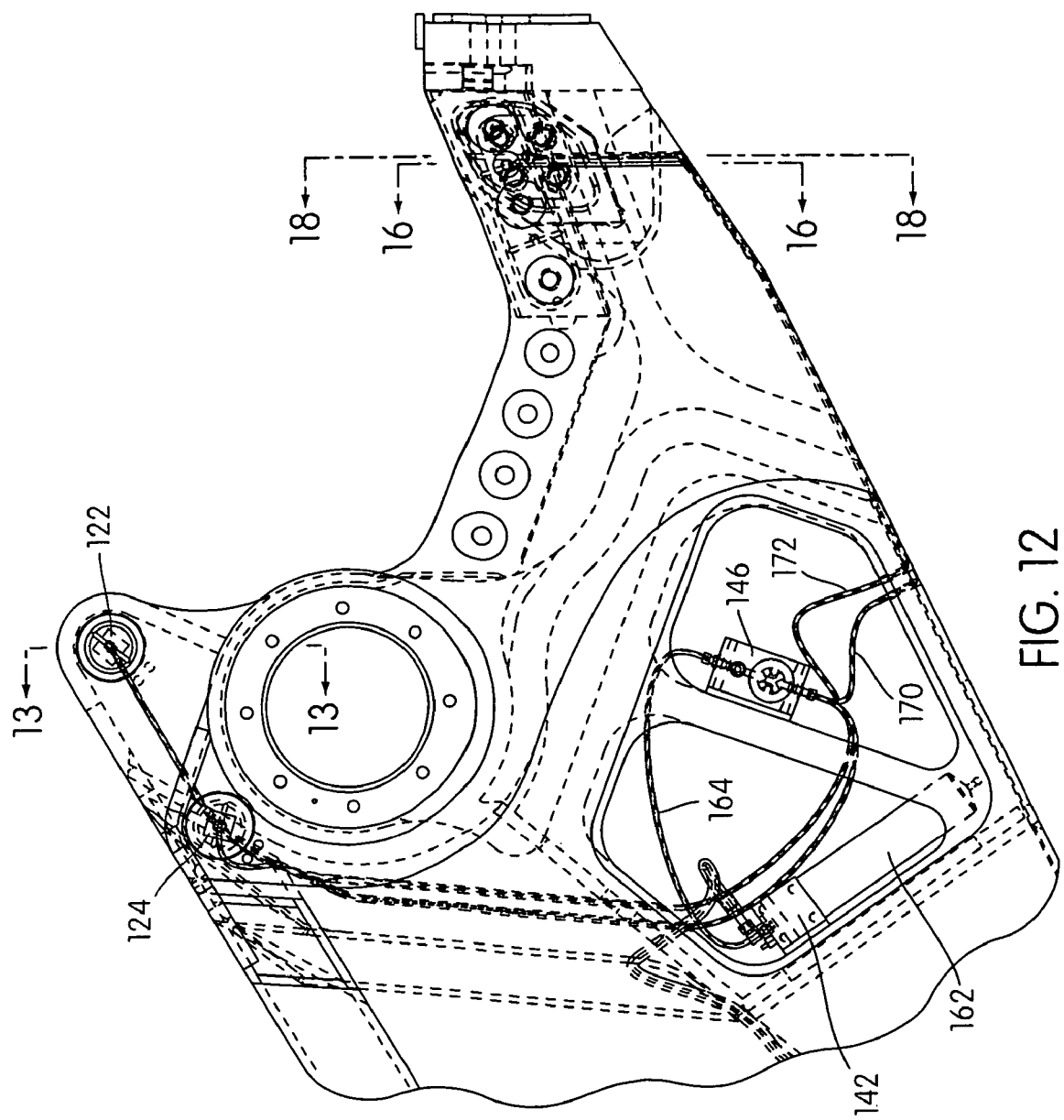
FIG. 12 is a partial plan view of the lower jaw assembly of a heavy-duty metal demolition shears incorporating a lubricating system according to the invention.
Figure 13:
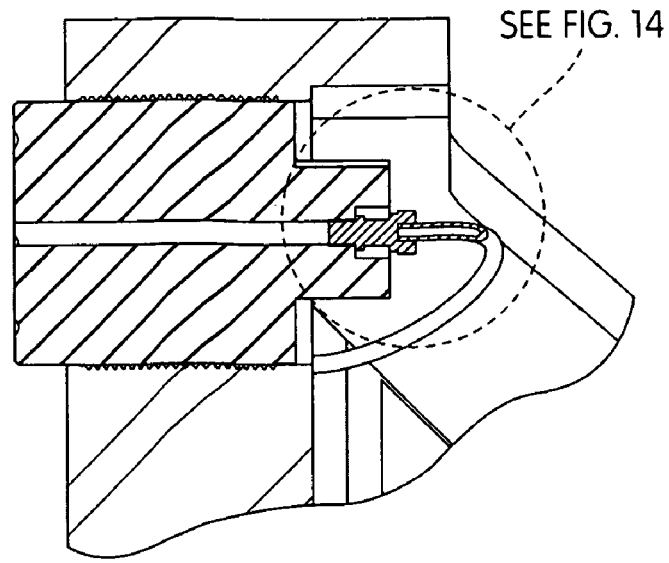
FIG. 13 is a section view taken along lines 13-13 in FIG. 12.
Figure 14:
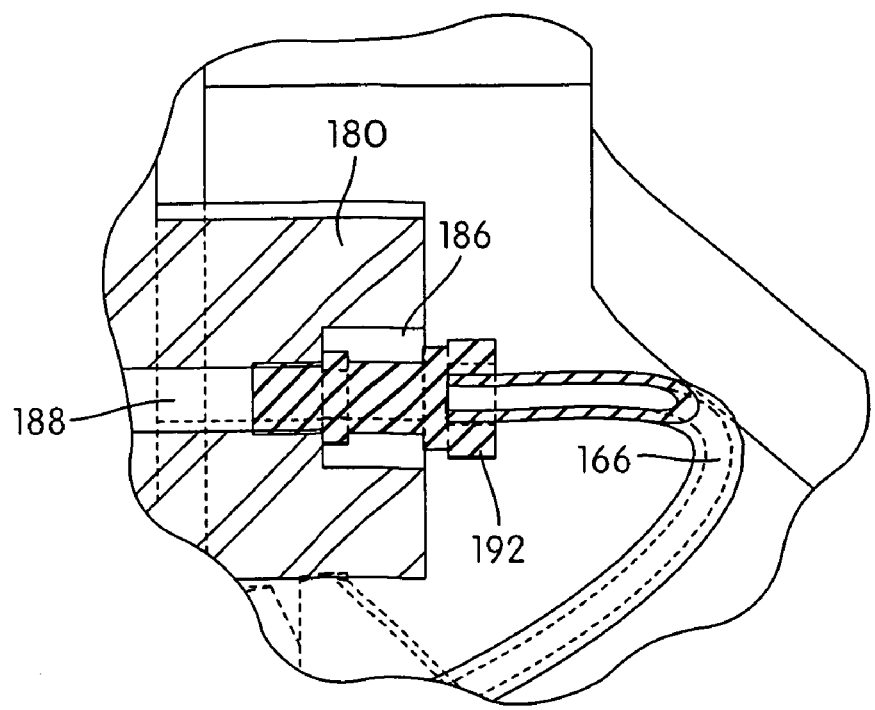
FIG. 14 is a close-up view of the circled portion thereof, illustrating a lateral blade stabilizer according to the invention.

Details as to the construction and mounting of the left-hand lateral blade stabilizer 122, the right-hand lateral blade stabilizer 124, and attachment of the individual lubricant output lines 166, 168 to them are illustrated in FIGS. 11-14. As illustrated in FIG. 11, the left-hand and right-hand lateral blade stabilizers are each manufactured as solid, generally cylindrical members. The stabilizers include an end-most abutment portion 176 that includes a lateral stabilizing wear surface 176a, an externally threaded shank portion 178, and a polygonal (e.g., square) bolt end 180. The abutment portion 176 may terminate in a slight frustroconical beveled lubricant dispersion stand-off 182 that is on the order of 0.18 inch in height. As illustrated in FIGS. 13 and 14, the bolt end 180 has a central cavity or pocket 186 which protects the lubricant fittings 192, and a central, axially extending lubricant conduit 188 extends from the bottom of the socket 186 all the way through the blade stabilizer to the wear surface 176a of the abutment portion 176, as shown in FIG. 11. The lubricant dispersion stand-off 182 has a diametrically extending lubricant dispersion groove 190 extending across it, and the central, axially extending lubricant conduit 188 communicates lubricant into it. The lateral blade stabilizers 122, 124 may be machined from steel, aluminum, bronze, or brass.

The left-hand and right-hand lateral blade stabilizers 122, 124 are screwed into internally threaded bores extending through the left-hand lower jaw plate 102a and the right-hand lower jaw plate 102b, respectively, generally above the pivot structure 106. Their positions are secured by placing a lock plate over each of the bolt ends and securing the lock plates to the side plates 102a and 102b, as is known in the art.

As further illustrated in those figures and in FIG. 12, the individual lubricant output lines 166, 168 are routed generally internally and secured to the internal structure of the stick structure 101 of the shears; they pass externally out through appropriately sized bores formed in the lower jaw side plates 102a and 102b, generally in the vicinity of the lateral blade stabilizers 122 and 124, as illustrated in FIGS. 3-7.

The lubricant output lines 166, 168 interconnect with the lateral blade stabilizers 122 and 124 by means of swiveling NPT (National Pipe Thread) compression fittings 192. The compression fittings 192 are crimped onto the ends of the lubricant output lines 166, 168, and their opposite, male ends are threaded into the axially extending lubricant conduits 188, as illustrated in FIGS. 13 and 14. With this arrangement, lubricant is applied to reduce wear between the lateral stabilizing wear surface of the arcuate wear portion 128 on the left side of the upper jaw 104 and the corresponding lateral stabilizing wear surface 176a of the left-hand lateral blade stabilizer 122, and between the lateral stabilizing wear surface of the arcuate wear member 130 and the lateral stabilizing wear surface 176a of the right-hand lateral blade stabilizer 124 on the right side of the shears 100 by conveying lubricant through the lubricant conduits 188 and allowing it to be distributed over the surface of lubricant dispersion stand-offs 182 by means of the lubricant dispersion grooves 190.

Further details of the construction and arrangement of the guide blade 118 and the lower secondary cutting blade insert member 116, and the means by which they are lubricated, are shown in FIGS. 3-7, 9, and 15-19. As illustrated in those figures, the guide blade 118 and the lower secondary cutting blade insert member 116 are both formed as prisms, with the guide blade being a generally hexagonal prism (i.e., its two major surfaces, which are the primary wear surfaces, are formed as hexagons) and the lower secondary cutting blade insert member being a generally rectangular prism (i.e., its two major surfaces, edges of which form the cutting edges, is formed as a rectangle). (The guide blade could also be generally rectangular, if so desired.) The guide blade 118 and the lower, secondary cutting blade insert member 116 are seated against appropriately configured seating surfaces provided along the slot-facing surfaces of the left-hand lower jaw side plate 102a and the right-hand lower jaw side plate 102b, respectively.

Figure 15:
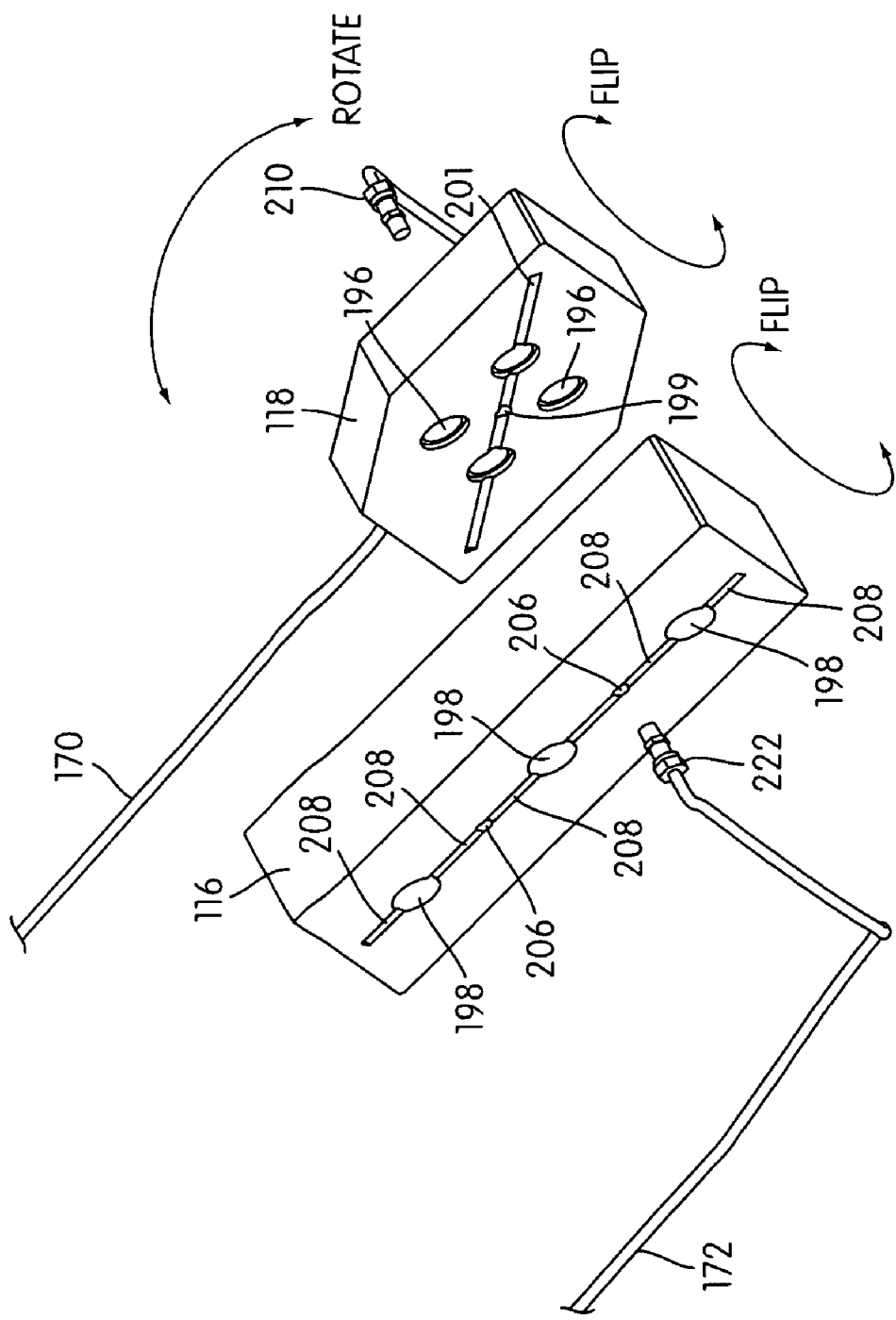
FIG. 15 is a perspective view illustrating a guide blade and a blade insert member configured for use with a lubricating system according to the invention.

The guide blade 118 and the lower secondary cutting blade insert member 116 (as well as the other cutting blade insert members, if desired) may be configured so they each can be flipped about their diagonal and longitudinal axes, respectively, so that both major surfaces of each can be presented, as illustrated in FIG. 15 and as is also generally known in the art. Additionally, the guide blade 118 and lower secondary cutting blade insert member 116 (as well as the other cutting blade insert members, if desired) may be configured so that they each can be rotated 180° about their respective transverse axes and re-seated against their respective seating surfaces, as also illustrated in FIG. 15.

The guide blade 118 is secured against its seating surface 202 (FIG. 16) by means of plow bolts 194 (FIGS. 3 and 5) that pass through bolt holes 196 extending through the guide blade 118 and through the left-hand lower jaw side plate 102a, as is known in the art. Similarly, the lower secondary cutting blade insert member 116 is secured against a seating surface or, as shown, against an adjusting plate and shim arrangement 216 by means of plow bolts (not shown) that pass through bolt holes 198 extending through the blade insert member and through bolt holes extending through the right-hand lower jaw side plate 102b and the adjusting plate and shim 216.

Figure 16:
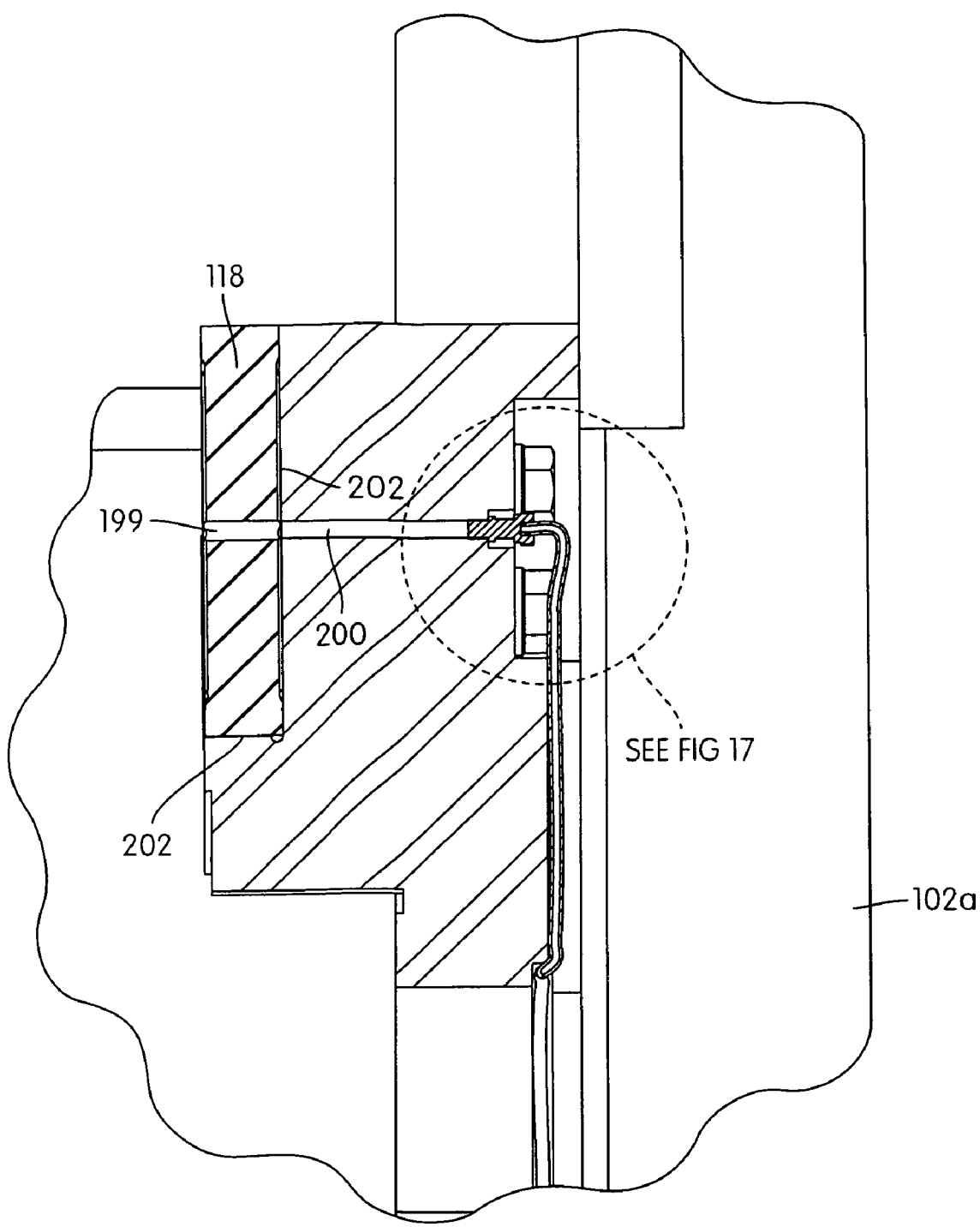
FIG. 16 is a section view taken along lines 16-16 in FIG. 12.
Figure 17:
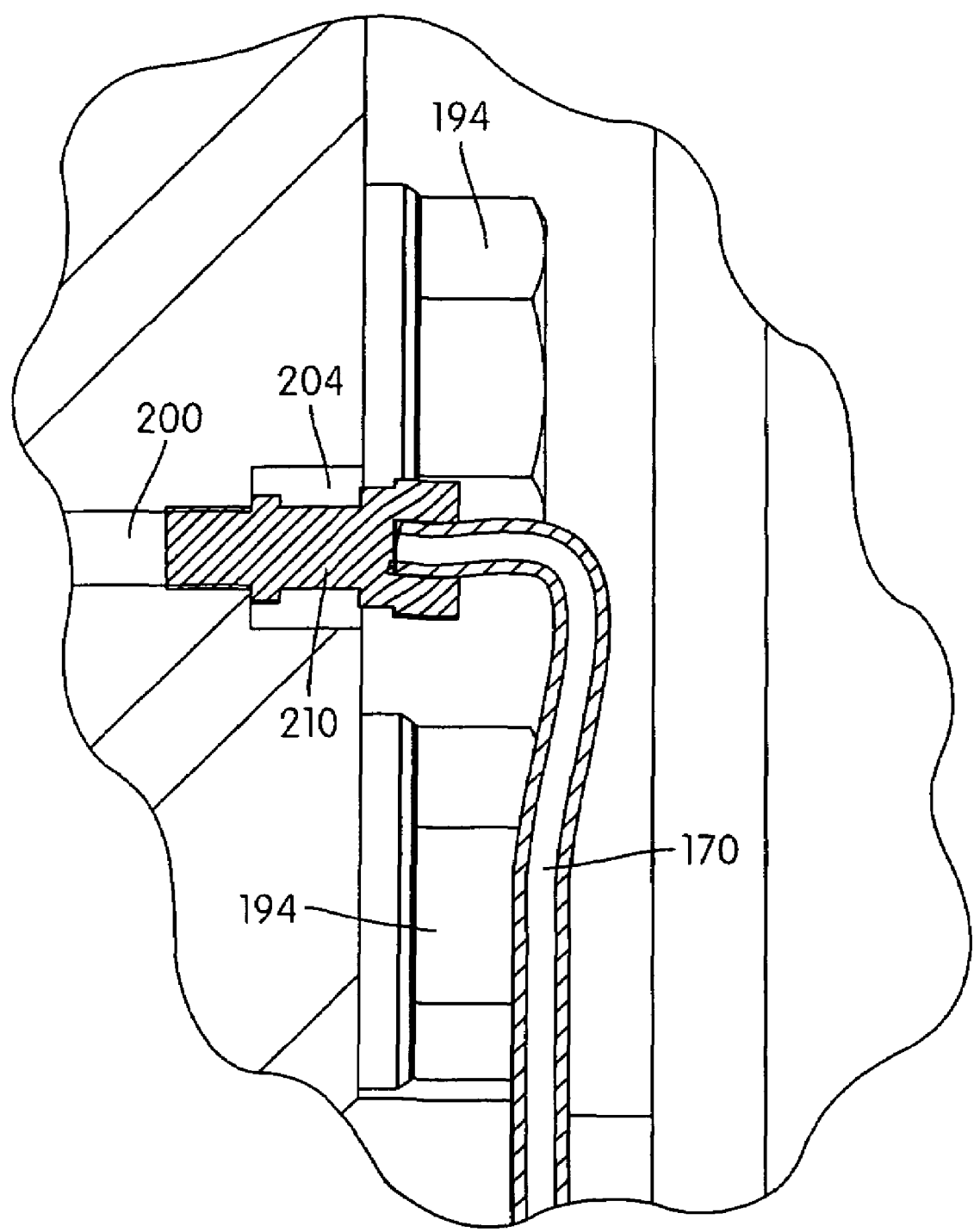
FIG. 17 is a close-up view of the circled portion thereof, illustrating a guide blade according to the invention.

As further illustrated in FIGS. 15-17, the guide blade 118 has a lubricant conduit 199 that extends laterally through the guide blade 118, along the axis of rotation, from one side (major surface) to the other side (major surface). On each side of the guide blade 118, a lubricant dispersion groove 201 is formed into which the lubricant conduit 199 distributes lubricant on to the lateral wear surface of the guide blade 118. The lubricant dispersion grooves 201 extend substantially along the diagonal length of both of the major surfaces of the guide blade 118.

Figure 18:
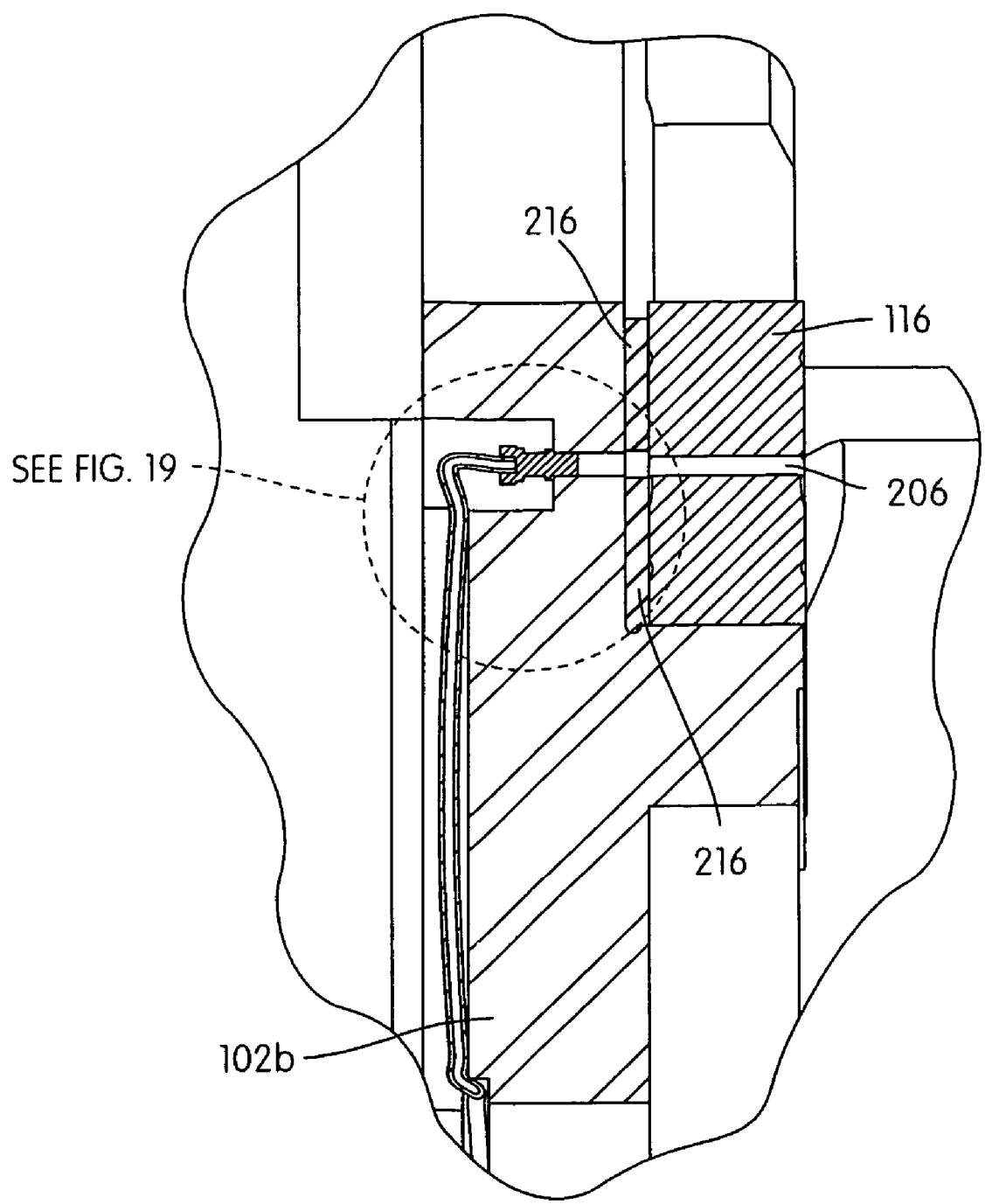
FIG. 18 is a section view taken along lines 18-18 in FIG. 12.
Figure 19:
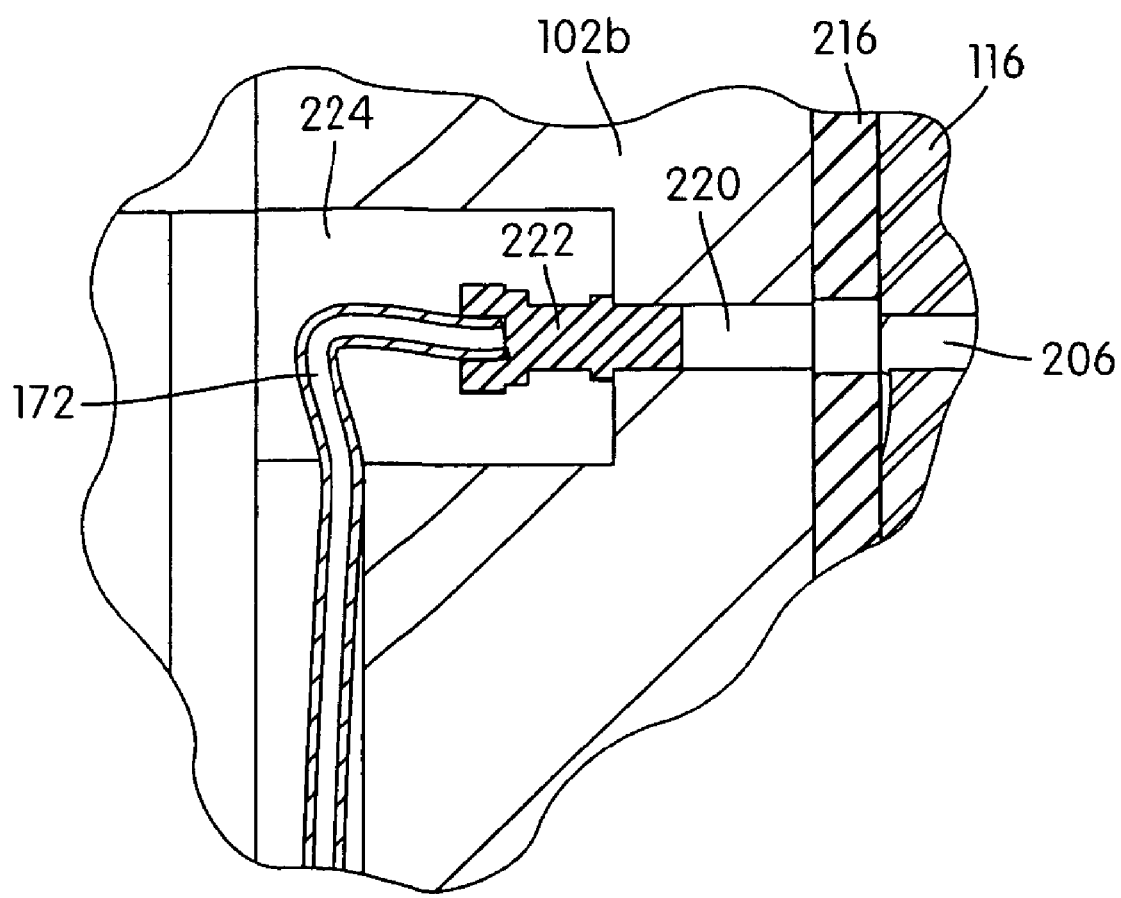
FIG. 19 is a close-up view of the circled portion thereof, illustrating a blade insert member according to the invention.

Similarly, as shown in FIGS. 15, 18, and 19, the lower secondary blade insert member 116 has one or more (in this case two) lubricant conduits 206 that extend laterally through the blade insert member 116, from one side (major surface) to the other side (major surface) of the blade insert member. The number and positioning of the lubricant conduits 206 may vary, depending on the number and arrangement of the bolt holes 198. Additionally, each side (major surface) of the blade insert member 116 has a lubricant dispersion groove 208 that extends longitudinally along the major surface of the blade insert member. As shown in FIG. 15, the lubricant conduit or conduits 206 terminate into the lubricant dispersion grooves 208 on each side of the blade insert member 116.

As illustrated in FIGS. 16 and 17, a lubricant channel 200 extends laterally outwardly from the seating surface 202 against which the guide blade 118 sits and terminates into a counterbore or cavity 204 that protects the fitting 210. As illustrated in FIG. 16, the guide blade 118 is seated against seating surface 202 with the central lubricant conduit 199 that extends through the guide blade 118 aligned with the lubricant channel 200 extending through the lower jaw side plate 102a. Externally, i.e., on the outer-facing side of the left-hand lower jaw side plate 102a, a compression fitting 210 is inserted into the counterbore or cavity 204, with the male end of the compression fitting 210 screws into the end of the lubricant channel 200. The compression fitting 210 is crimped onto the end of the individual lubricant output line 170. Thus, lubricant can be provided to the exposed wear surface of the guide blade 118 by being conveyed along individual lubricant output line 170, through the lubricant channel 200 formed in the lower jaw side plate 102a, through the lubricant conduit 199 extending through the guide blade 118, and then being distributed along the lubricant dispersion groove 201. As the upper jaw pivots open and closed, and the wear plate 120 slides past the guide blade 118, lubricant will be distributed over the exposed surfaces of both the guide blade 118 and the wear plate 120, thus reducing friction and hence wear on those parts. The sliding contact between the wear plate 120 and guide blade 118 may be continuous or discontinuous as the jaws 102, 104 pivot relative to each other.

Similarly, as illustrated in FIGS. 18 and 19, a lubricant channel 220 extends laterally through the lower right-hand jaw side plate 102b. The lower secondary blade insert member 116 is seated against a seating surface or, as shown, an adjusting plate and shim 216, with lubricant conduit 206 extending through the blade insert member 116, aligned with lubricant conduit 220, and extending through the lower jaw side plate 102b and through the adjusting plate and shim 216. A swiveling NPT compression fitting 222 is crimped onto the end of individual lubricant output line 172. The lubricant compression fitting 222 fits within pocket 224, which protects the fitting, and the male end of the compression fitting 222 screws into the end of the lubricant conduit 220.

With this arrangement, lubricant is provided to the exposed major surface of the blade insert member 116 by being provided along lubricant output line 172 and flowing through lubricant channel 220 (in the lower jaw side plate 102b) and lubricant conduit 206 (through the blade insert member), then being distributed along the exposed lubricant dispersion groove 208. As the upper jaws opens and closes and the upper secondary blade insert member moves past the lower secondary blade insert member, lubricant will be spread over the major exposed surfaces of both, thereby reducing frictional wear and extending service life of the parts.

Figure 7:
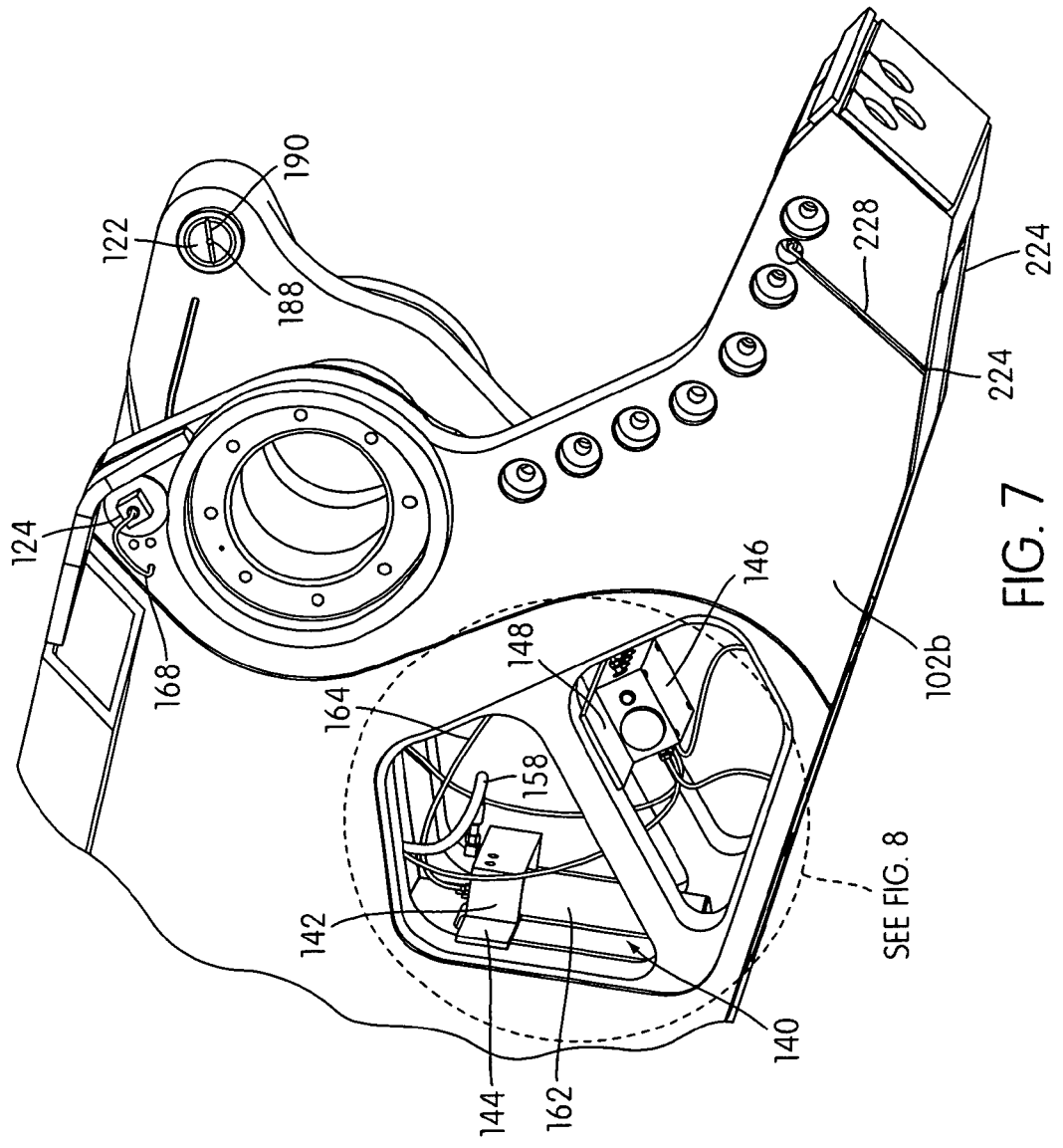
FIG. 7 is a perspective view of the lower jaw assembly of a heavy-duty metal demolition shears, without the upper jaw assembly or pivot group installed, incorporating a lubricating system according to the invention.
Figure 8:
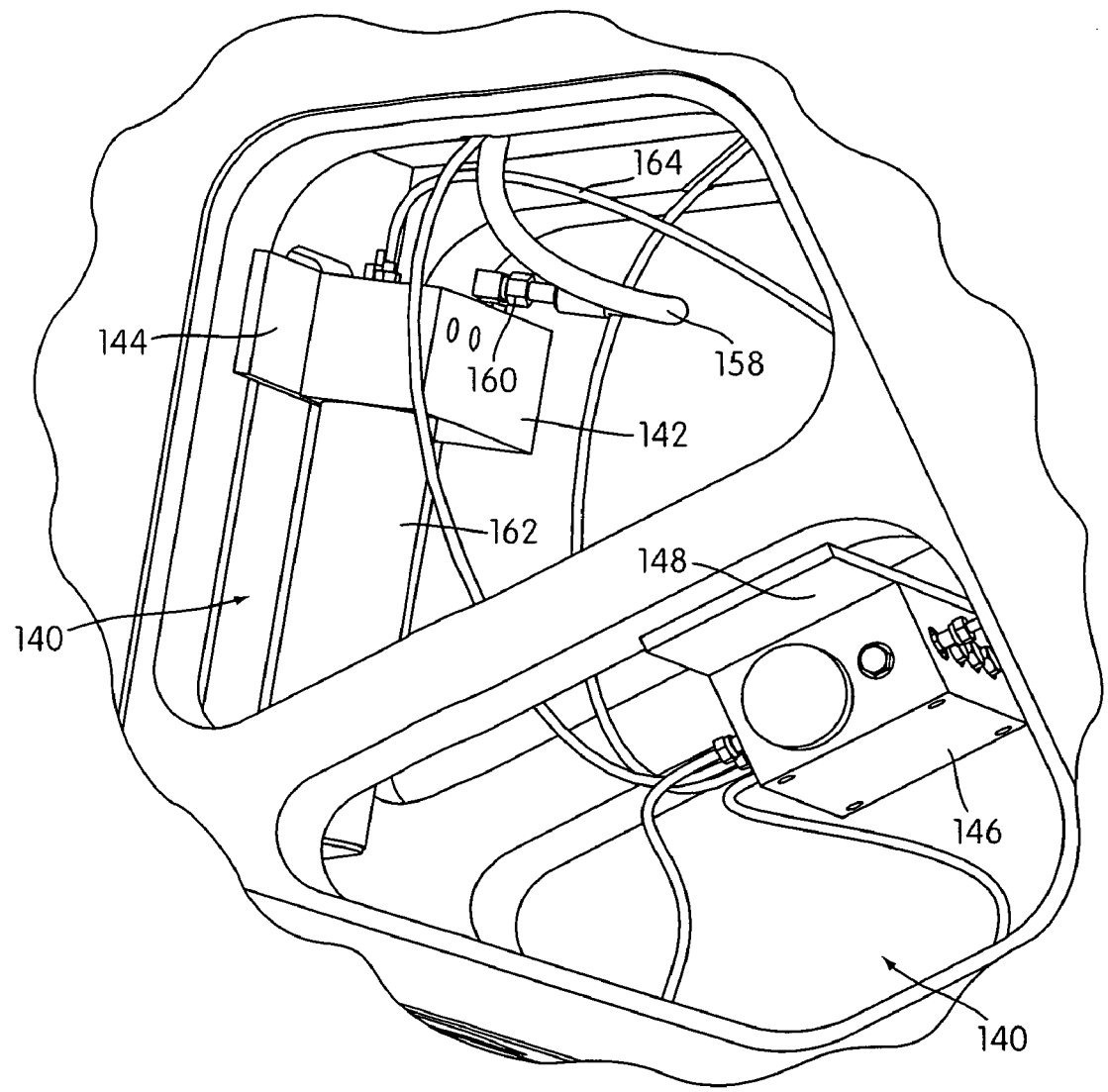
FIG. 8 is a close-up view illustrating components of the lubricating system.

As illustrated, for example, in FIGS. 7 and 12, the lubricant output lines 170 and 172 are routed generally internally through the structure of the jaws. They then exit through lubricant output line exit ports 224 on either side of the jaws and extend along lubricant output line guide channels 226 and 228 formed in the outer surfaces of the left-hand and right-hand lower jaw side-plates 102a and 102b, respectively.

FIGS. 20-24 illustrate heavy-duty metal demolition shears 300 according to another embodiment of the present invention. The shears 300 are generally similar to the above-described shears 100 except that a lubricating system 340 provides lubricant to wear portions (e.g., wear parts, portions of parts of the shears 300, etc.) via an upper jaw 304 instead of a lower jaw 302. Accordingly, a detailed description of the generally redundant features (including, among other features, upper and lower jaws, a stick, a lubricant pump, an SSV valve, and the functional and structural relationship between various components) is omitted.

Figure 20:
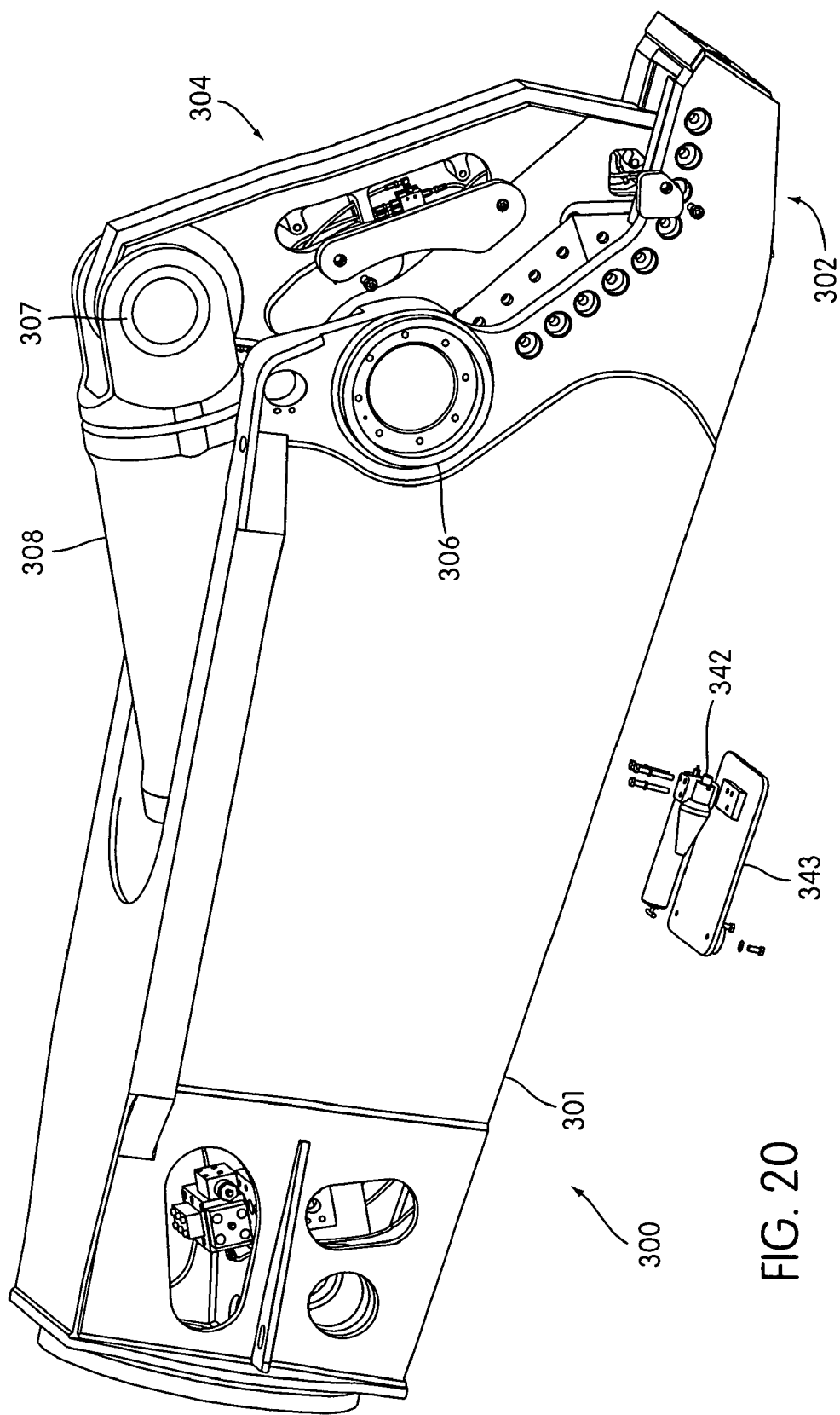
FIG. 20 is a partially-exploded, perspective view of the right side of a closed shears according to an alternative embodiment of the present invention.

As shown in FIG. 20, the upper and lower jaws 304, 302 pivotally connect to each other at a pivot structure 306. A hydraulic cylinder 308 pivotally connects to the upper jaw 304 at a pivot structure 307. The hydraulic cylinder 308 also pivotally connects to a body 301 or "stick" of the shears 300. The pivot structures 306, 307 include pins and mating bores to allow relative pivotal movement. The hydraulic cylinder 308 drives the upper jaw 304 open and closed relative to the lower jaw 302.

Figure 21:
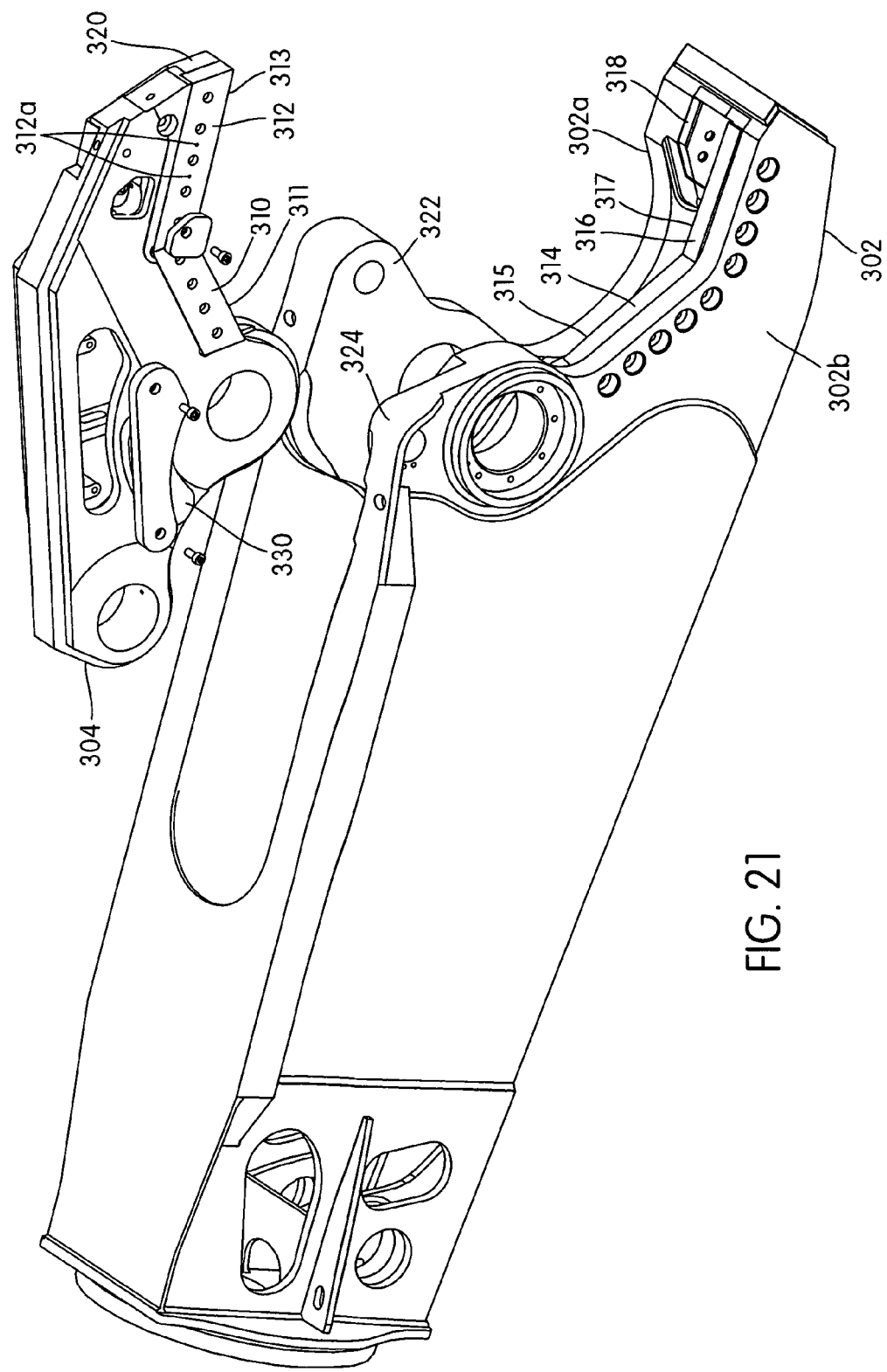
FIG. 21 is a partially-exploded, perspective view of the right side of the shears in FIG. 20 in an open position.
Figure 22:
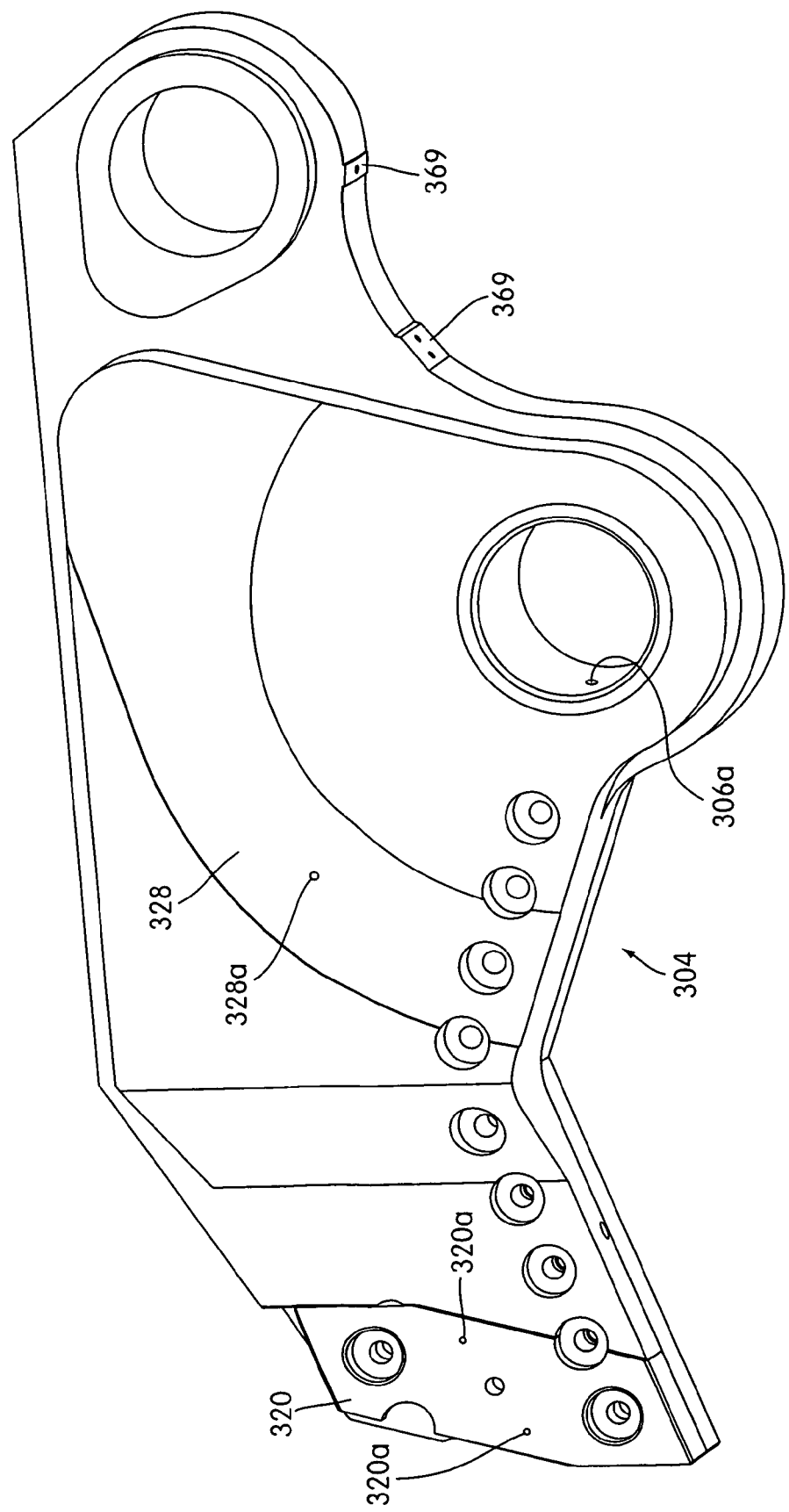
FIG. 22 is a perspective view of a left side of an upper jaw of the shears in FIG. 20.

As shown in FIG. 21, upper primary and secondary blade insert members 310, 312, respectively, are secured to a blade seat portion of the upper jaw 304 and provide primary and secondary upper cutting edges 311, 313, respectively. Similarly, lower primary and secondary blade insert members 314, 316, respectively, are secured to seating surfaces formed along the right-hand lower jaw side plate 302b and provide primary and secondary lower cutting edges 315, 317, respectively. A wear guide or guide blade 318 is attached to an inner, slot-facing seat formed along left-hand side plate 302a opposing the lower primary and secondary blade insert members, and a forward wear plate 320 or piercing tip is attached to a lateral surface at a front, nose portion of the upper jaw 304.

As shown in FIG. 21, the shears 300 also includes a left-hand lateral blade stabilizer 322 and a right-hand lateral blade stabilizer 324. As the upper jaw 304 pivots open and closed, depending on lateral forces on the upper jaw 304, wear surfaces of the left-hand lateral blade stabilizer 322 will make sliding contact along an arcuate wear surface 328 on the left side of the upper jaw 304 (see FIG. 22), and a wear surface of the right-hand lateral blade stabilizer 324 will make sliding contact along the wear surface of an arcuate wear member 330.

Figure 23:
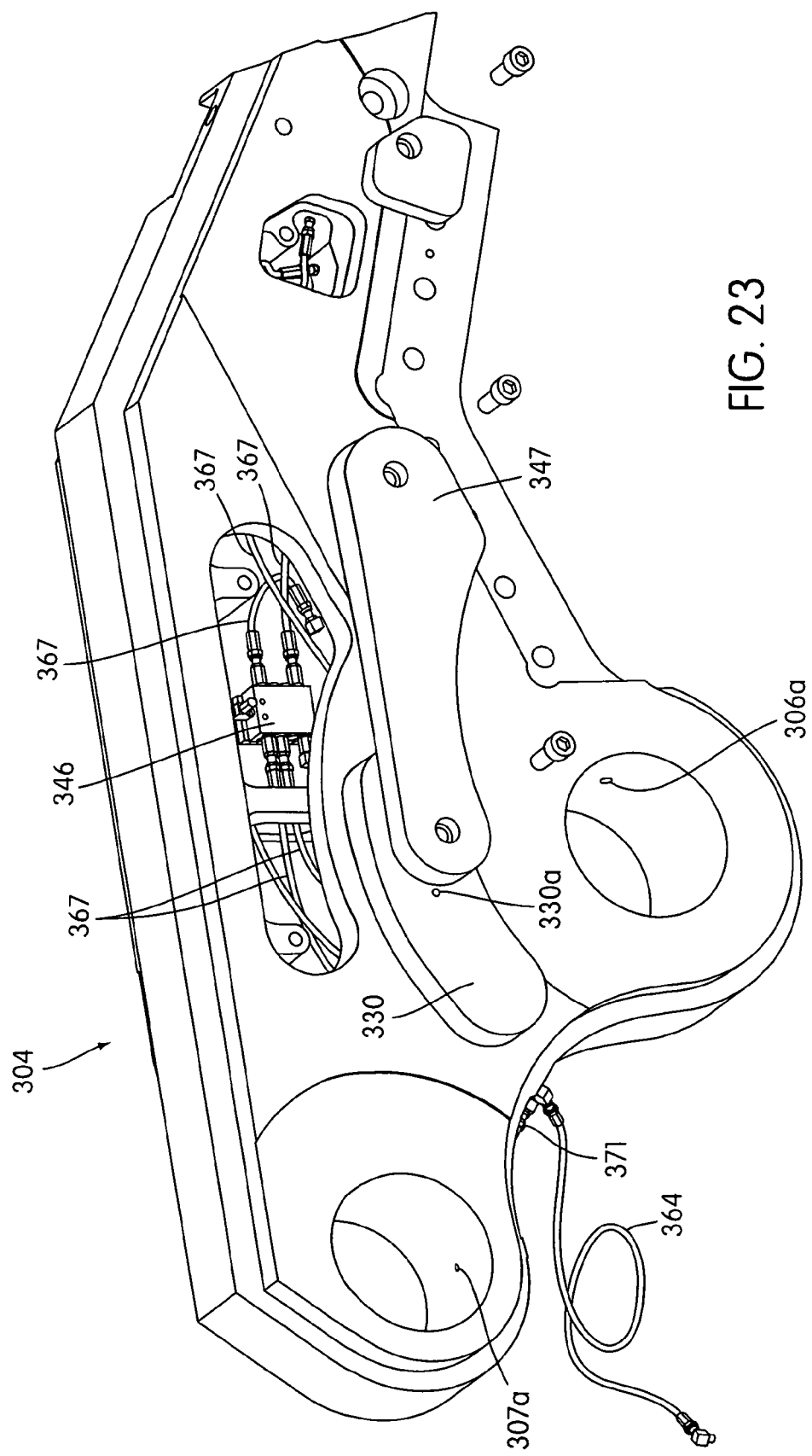
FIG. 23 is a partially-exploded, perspective view of the right side of the upper jaw in FIG. 22.
Figure 24:
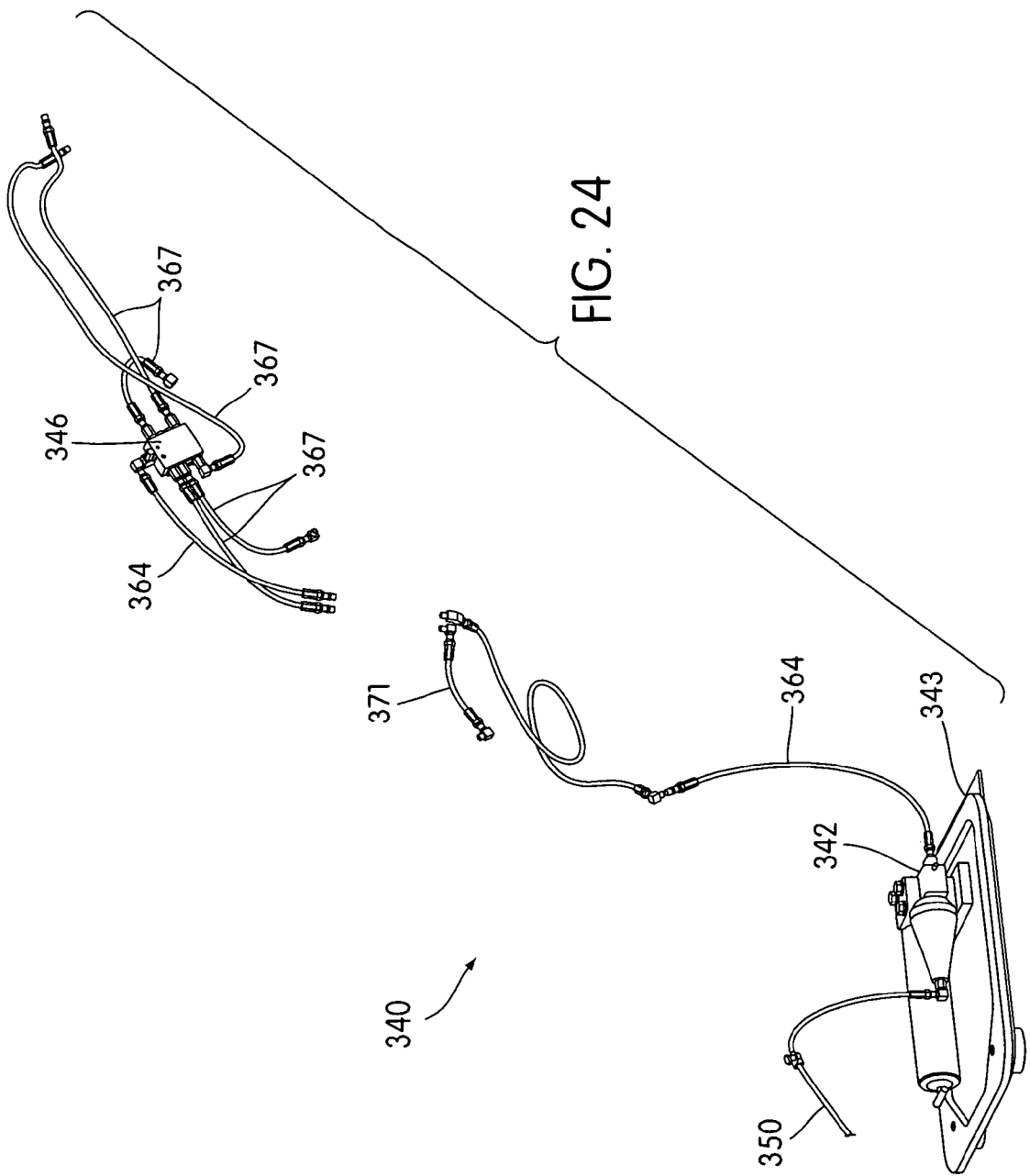
FIG. 24 is a perspective view of a lubricating system of the shears in FIG. 20.

As shown in FIGS. 23 and 24, a lubricating system 340 includes a pump 342 (see FIGS. 20, 24) and an SSV valve (sequential lubricant distributor) 346 (see FIG. 23). As shown in FIG. 20, the pump 342 mounts inside the body 301 on an access plate 343. The pump 342 may alternatively be disposed at any other convenient position, as would be understood by one of ordinary skill in the art (e.g., in/on the upper jaw 304, external to the shears 300, etc.). The pump 342 may be driven by a hydraulic control line 350 similar to the previously-described hydraulic control line 150.

As shown in FIG. 23, the SSV valve 346 is mounted within the upper jaw 304 and is accessible via a removable access hatch 347. The pump 342 provides lubricant to the SSV valve 346 via a primary lubricant output line 364 that extends between the pump 342 and the SSV valve 346.

While the illustrated embodiment utilizes a single SSV valve 346, one or more additional SSV valves may be added without deviating from the scope of the present invention. For example, if wear surfaces on both the upper and lower jaws are to be lubricated, one SSV valve may be mounted to the stick or lower jaw to provide lubrication to various wear surfaces on the lower jaw. A second SSV valve may be disposed in the upper jaw to provide lubricant to various wear surfaces on the upper jaw. The SSV valves may connect to the lubricant supply in parallel or series. If connected in series, the first SSV valve receives lubricant from the lubricant supply and the second SSV valve receives lubricant from an output conduit of the first SSV valve.

As shown in FIG. 23, lubricant is channeled from the SSV valve 346 to various wear surfaces on various wear parts of the shears 300 via a plurality of lubricant output lines 367. The output lines 367 fluidly communicate with a lubricant port 330a in the arcuate wear member 330, a lubricant port 307a within a bore on the upper jaw 304 that defines a part of the pivot structure 307, a lubricant port 306a within a bore on the upper jaw that defines a part of the pivot structure 306, a lubricant port 328a in the arcuate portion 328 (see FIG. 22), lubricant ports 312a on the secondary blade insert 312 (see FIG. 21), and lubricant ports 320a on the wear plate 320 (see FIG. 22). The lubricating system 340 may alternatively and/or additionally provide lubricant to any point of friction on the shears 300 without deviating from the scope of the present invention (e.g., a pivotal structure connecting the cylinder 308 to the body 301, a forward edge of the wear plate 320, the primary blade 310, any of the mating wear surfaces on the lower jaw 302 or body 301, etc.). As in the shears 100, various dispersion grooves, channels, passages, etc. may be disposed on these wear surfaces to improve dispersion of the lubricant over the various wear surfaces (see, e.g., FIG. 9). Provision of lubricant to such wear surfaces improves the efficiency of the cutting action of the shears 300 and increases the useful life of such wear parts.

Figure 25:
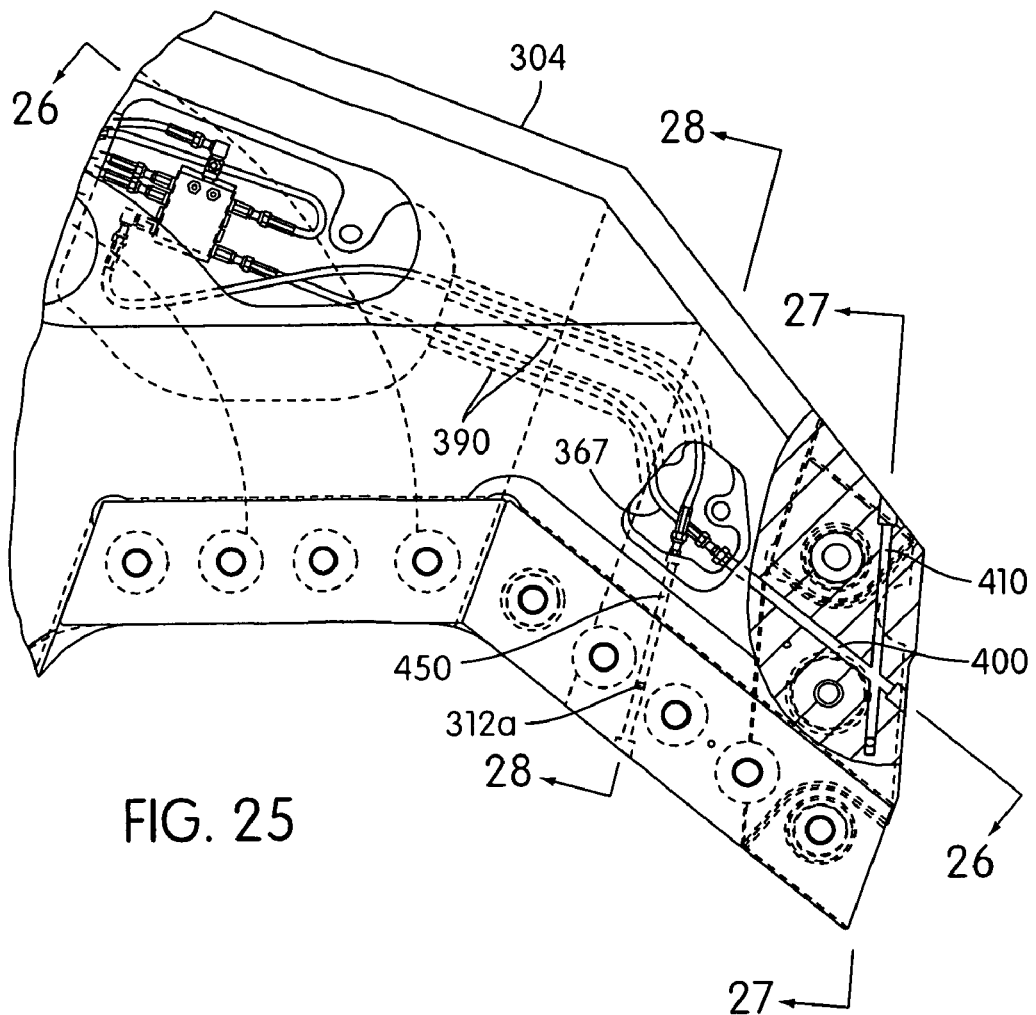
FIG. 25 is a partial right side view of the upper jaw of the shears in FIG. 20.

To fluidly connect the lubricant supply lines 367 to the lubricant ports 306a, 307a, 312a, 320a, 328a, 330a, various bores, machined passages, drilled passages, channels, fluid lines, tubes, plugs, etc. may be used. Such fluid paths may be formed by machining grooves in laminates that are subsequently sandwiched together to form passages. For example, as shown in FIG. 25, two lubricant supply lines 367 extend through passages 390 in the upper jaw 304. These passages 390 are formed by machining a channel into a side of the upper jaw 304 and covering the machined channel with a side plate. Additionally and/or alternatively, various interconnecting holes may be drilled and plugged to form the passages, as discussed below. Lubricant passages may be formed in low stress areas of the shears 300 (e.g., at or near the center of a structural component) so that they do not significantly affect the strength of such components. Any other suitable type of fluid path may be additionally and/or alternatively incorporated into the lubricant output conduit to direct lubricant to the lubricant ports 306a, 307a, 312a, 320a, 328a, 330a.

Lubricant is provided to the lubricant port 307a from a lubricant supply line 367 via two bores 369 in the upper jaw 304 (see FIG. 22) and an intermediate supply line 371 that fluidly connects the bores 369 (see FIG. 23).

Figure 26:
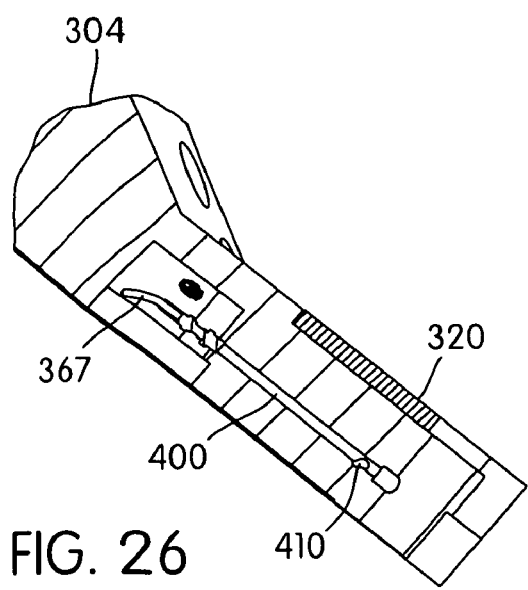
FIG. 26 is a cross-sectional view of the upper jaw, taken along the line 26-26 in FIG. 25.
Figure 27:
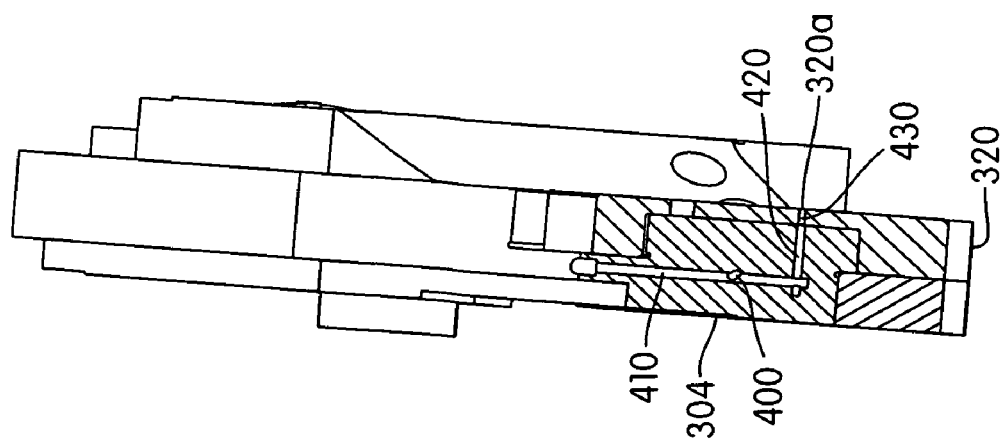
FIG. 27 is a cross-sectional view of the upper jaw, taken along the line 27-27 in FIG. 25.

As shown in FIGS. 25, 26, and 27, the lubricant supply line 367 fluidly connects to the lubricant port 320a in the wear plate 320 via interconnecting longitudinal, vertical, and transverse bores 400, 410, 420 in the upper jaw 304 and a mating transverse bore 430 in the wear plate 320. As shown in FIG. 25, an upper opening of the bore 410 and a forward opening of the bore 400 are plugged to prevent lubricant from escaping therethrough. As shown in FIG. 27, the bores 420, 430 are aligned with each other when the wear plate 320 is mounted to the upper jaw 304 such that lubricant flows from the supply line 367 to the port 320a via the bores 400, 410, 420, 430.

Figure 28:
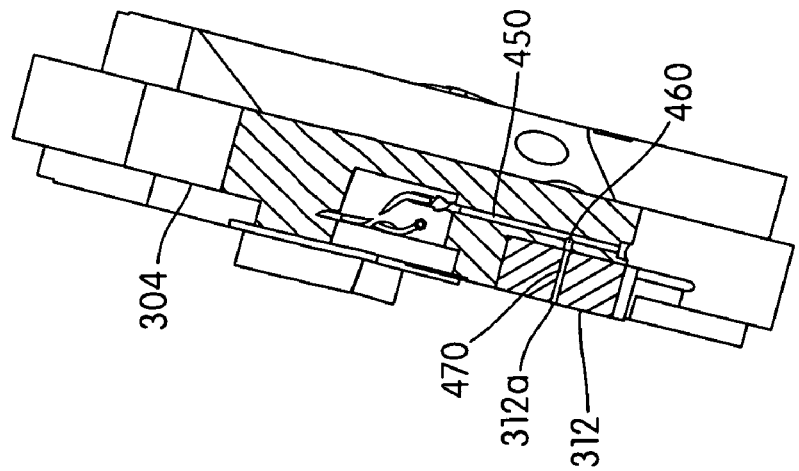
FIG. 28 is a cross-sectional view of the upper jaw, taken along the line 28-28 in FIG. 25.

As shown in FIGS. 25 and 28, the lubricant supply line 367 fluidly connects to the lubricant port 312a in the secondary blade 312 via interconnecting vertical and transverse bores 450, 460 in the upper jaw 304 and a mating transverse bore 470 in the secondary blade 312. A lower opening of the bore 450 is plugged. The bores 460, 470 align with each other when the secondary blade 312 is mounted to the upper jaw 304 such that lubricant flows from the supply line 367 to the port 312a via the bores 450, 460, 470.

A lubricant output conduit extends from the lubricant pump 342 to lubricant ports 306a, 307a, 312a, 320a, 328a, 330a on the wear surfaces of various wear portions of the shears 300. The illustrated lubricant output conduit includes the lubricant output lines 367, SSV valve 346, the lubricant output line 364, lubricant ports 306a, 307a, 312a, 320a, 328a, 330a, various conduit fittings, connectors, various bores (e.g., bores 400, 410, 420, 430, 440, 450, 460, 470), machined passages, channels, fluid lines, and/or plugs. However, one or more of these portions of the lubricant output conduit may be omitted without deviating from the scope of the present invention. For example, some fluid passageways to specific ones of the lubricant ports 306a, 307a, 312a, 320a, 328a, 330a may include greater or fewer conduit components.

The lubricating system 340 may be retrofitted onto a conventional non-lubricating shears by replacing a conventional upper jaw with the upper jaw 304. The pump 342 and associated supply line 364 may be disposed at any convenient position and operatively connected to a hydraulic control line. In this manner, lubricant can efficiently and cost-effectively be provided to a conventional non-lubricating shears.

In an alternative embodiment, the SSV valve 346 is eliminated. Instead, one or more of the various lubrication ports 306a, 307a, 312a, 320a, 328a, 330a fluidly connect to each other and to the fluid output line 364 via a network of interconnected fluid passages. Interconnecting such passages reduces the overall number of fluid passage components because fluid paths can be consolidated where convenient. In such an embodiment, the interconnected lubrication ports are simultaneously lubricated. Appropriate orifices and/or other flow control devices can be added at or near the lubrication ports 306a, 307a, 312a, 320a, 328a, 330a to ensure that adequate lubricant reaches each of the ports 306a, 307a, 312a, 320a, 328a, 330a. The flow control devices may be designed to provide even lubricant distribution to each port 306a, 307a, 312a, 320a, 328a, 330a. Alternatively, the flow control devices may direct a higher volume of lubricant to lubricant port(s) that warrant relatively greater lubrication. Alternatively, the SSV valve 346 could be designed to provide varying volumes of lubricant to the different ports 306a, 307a, 312a, 320a, 328a, 330a as warranted.

Figure 29:
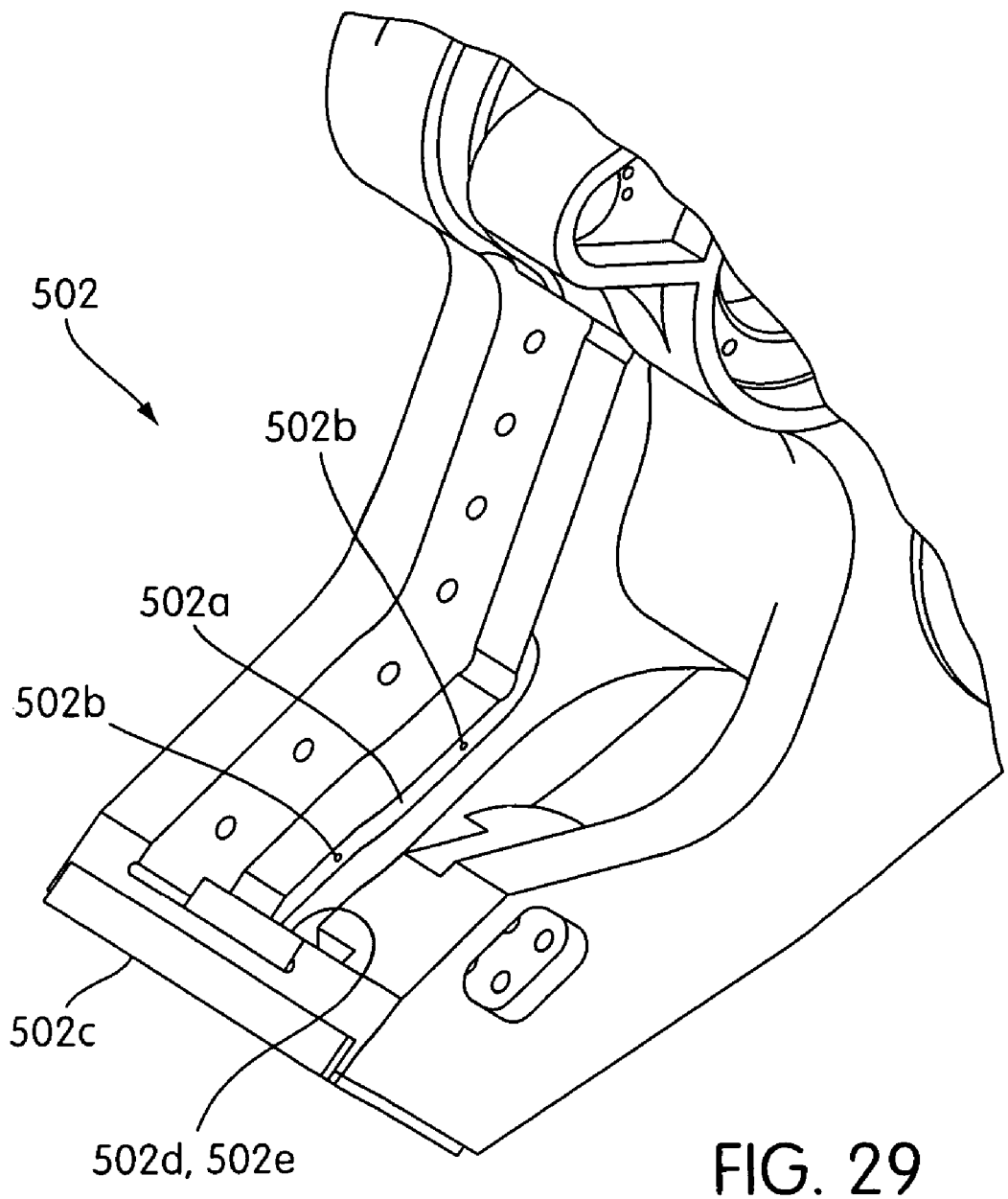
FIG. 29 is a partial perspective view of a lower jaw of a metal demolition shears according to an alternative embodiment of the present invention.

FIG. 29 illustrates a lower jaw 502 according to an alternative embodiment of the present invention. The lower jaw 502 is generally similar to the above-described lower jaws 102, 302. However, the lower jaw 502 differs from the previously described lower jaws in that an inner wear surface 502a of the lower jaw 502 below the primary and secondary blade insert members is lubricated. The inner wear surface 502a is generally coplanar to an inner wear surface of an adjacent blade insert member (such as the previously described blade insert members 26, 116, 316). Lubrication ports 502b are disposed on the inner wear surface 502a. An additional lubrication port 502d is disposed on an inner wear surface 502e of a forward cross-member 502c of the lower jaw 502. The lubrication port 502d and inner wear surface 502e are disposed on a replaceable forward cross-member/wear plate, but may alternatively be integrally formed with the lower jaw 502. A lubrication port may additionally/alternatively be provided below the replaceable forward cross-member/wear plate on an inner surface of the jaw 502 adjacent to the inner wear surface 502e. The ports 502b, 502d connect via bores and/or other channels in the lower jaw 502 to a lubricant supply as previously discussed. Accordingly, the surfaces 502a, 502e are lubricated. Operation of the shears may spread the lubricant so as to additionally lubricate corresponding wear surfaces of the lower jaw 520 (e.g., the adjacent secondary and/or primary blade insert member) and upper jaw (e.g., primary and/or secondary blade insert member(s) on the upper jaw (e.g., blade insert member 510, 512, described below) or other wear surfaces on the upper jaw (e.g., wear surface 504b, described below)).

Figure 30:
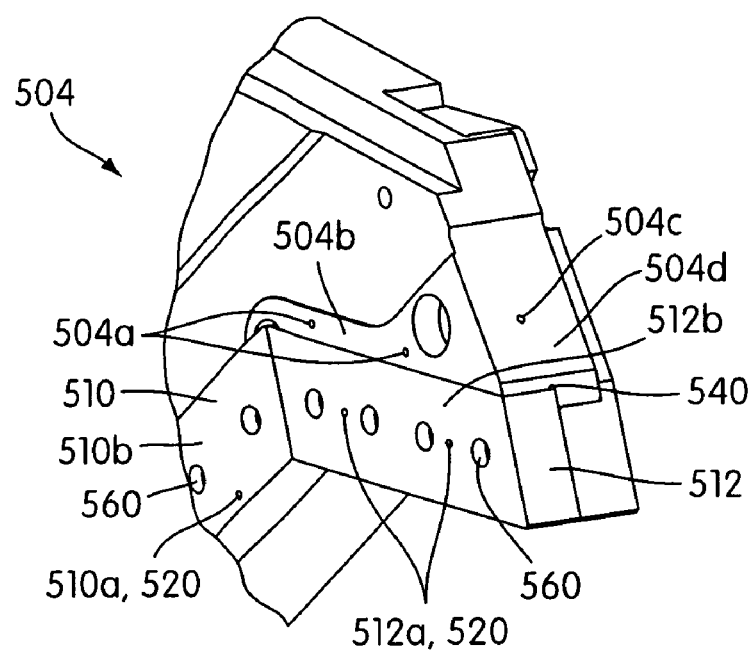
FIGS. 30 and 31 are partial perspective view of an upper jaw of a metal demolition shears according to an alternative embodiment of the present invention.
Figure 31:
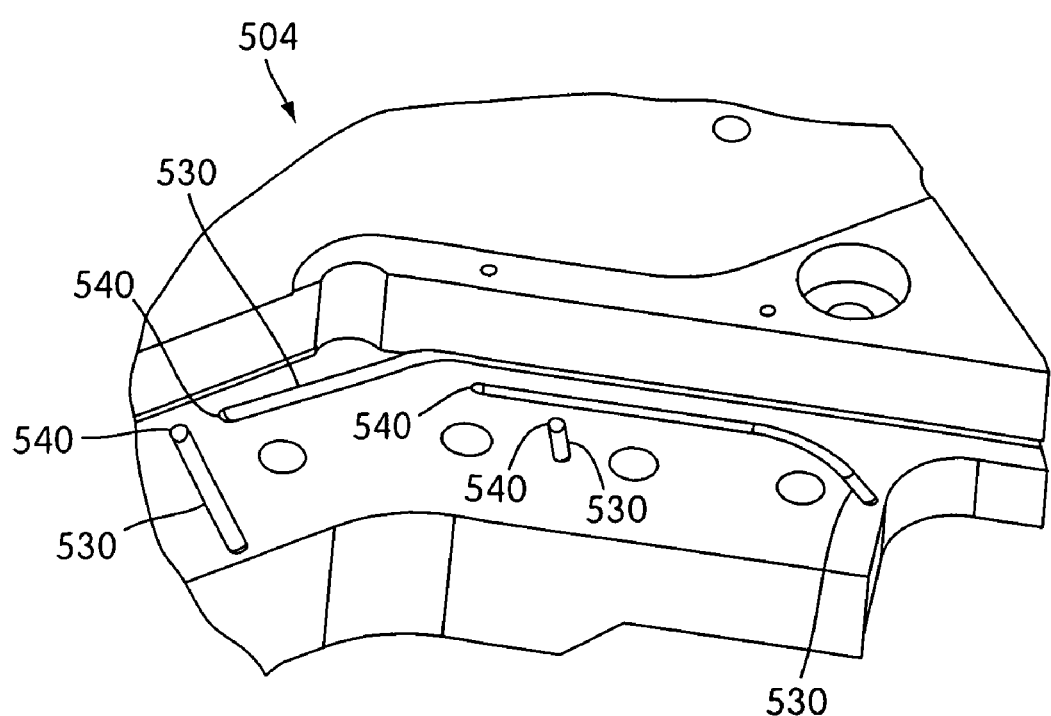

FIGS. 30 and 31 illustrate an upper jaw 504 according to an alternative embodiment of the present invention. The upper jaw 504 is generally similar to the upper jaw 304. However, the upper jaw 504 additionally and/or alternatively lubricates additional wear surfaces of the shears. As shown in FIG. 30, lubrication ports 504a provide lubricant to a lateral surface 502b of the upper jaw 504 above primary and secondary blade inserts 510, 512. Similarly, a lubrication port 504c in a leading edge surface 504d of the upper jaw 504 provides lubricant to the leading edge surface 504d. The lubrication ports 504a, 504c fluidly connect to a lubricant supply via a series of bores in the upper jaw 504 and other appropriate fluid passages (e.g., hoses, an SSV valve, etc.).

As shown in FIG. 30, the primary and secondary blade inserts 510, 512 also include lubrication ports 510a, 512a that provide lubricant to lateral side surfaces 510b, 512b of the inserts 510, 512. Similarly, a lubrication port 540 is formed at an intersection between the upper front corner of the secondary insert 512 and the upper jaw 540. The lubrication port 540 provides lubricant to a leading edge wear surface on the upper jaw 504. The lubricant ports 510a, 512a fluidly connect to inner lateral sides of the inserts 510, 512 via through bores 520. The through bores 520 fluidly connect to a lubricant supply via a series of bores in the upper jaw 504 and/or other appropriate fluid passages (e.g., hoses, an SSV valve, etc.). In the illustrated embodiment, the bores 520 and lubrication port 540 fluidly mate with grooves 530 formed in the upper jaw 504. When the blade inserts 510, 512 are mounted to the upper jaw 504, the blade inserts 510, 512 enclose the grooves 530 such that the grooves 530 become enclosed fluid conduits. Alternatively, the grooves 530 may be formed in the blade inserts 510, 512. One or more seals may be provided at the junctions between the grooves 530 and the blade inserts 510, 512 to discourage lubricant from leaking out of the fluid conduits. The grooves 530, in turn, fluidly connect to the lubricant supply via bores 540 in the upper jaw 504.

When the inserts 510, 512 are attached to the upper jaw 504, the channels 530 form enclosed fluid passages. While the illustrated embodiment utilizes channels in the upper jaw 504, channels could alternatively be formed on the inner lateral surfaces of the inserts 510, 512. Alternatively, the bores 520 could mate directly with bores in the upper jaw 504 such that additional channels would such as the channels 520 could be omitted.

As shown in FIG. 30, the inserts 510, 512 attach to the upper jaw 504 via bolts 560. Fluid passages may extend through these bolts 560 to lubrication ports in the bolts' heads such that the wear surfaces of the inserts 510 512 are lubricated via the these bolts 560 and associated bolt holes in the inserts 510, 512, thereby reducing the number of bores that are disposed in the inserts 510, 512. Inner openings of such bores connect to the lubricant supply via suitable fluid passages. Any other wear part that is bolted to the shears may additionally or alternatively be lubricated in this manner.

The above embodiments illustrate various wear parts that may be lubricated according to the present invention. The present invention, however, is by no means limited to these embodiments. Additional or alternative wear parts may be provided with lubricant by means of a lubricating system. For example, the lower primary cutting blade insert member 114 could also be provided with lubricant. In such an embodiment, the more limited blade bypass associated with the primary cutting blades (as compared to the secondary cutting blades) may be taken into consideration in positioning the lubricant dispersion grooves (described in detail below) along the faces of the blade insert members. One or more additional and/or alternative wear surfaces, cutting surfaces, pinned connections (e.g., pivot structure 106), stabilizing surfaces, and supporting surfaces on the lower or upper jaws 102, 104 may be lubricated without deviating from the scope of the present invention.

The above embodiments illustrate lubricating systems disposed on a shears with a fixed stick/lower jaw and a movable upper jaw. However, a lubricating system may be incorporated into any other type of shears without deviating from the scope of the present invention. For example, a lubricating system may be used in a universal processors jaws in which two jaws are actuated by two cylinders and each pivot independently of the stick about a common pin relative to each other. A lubricating system according to the present invention may be incorporated into a bucket linkage shear (BLS) or rebar cutting shear (RCS) in which sets of jaws attach to the end of the stick and derive power from an excavator's bucket cylinder. One or more embodiments of the invention may be incorporated into the conventional shears such as those disclosed in U.S. Pat. Nos. 4,198,747, 4,558,515, 4,838,493, 5,060,378, 5,127,567, and 5,531,007, and U.S. Published Application No. 2005-0091852 A1, all of which are incorporated by reference herein.

In the embodiments illustrated above, the lubricated wear surfaces comprise surfaces that make sliding or shearing contact with other surfaces of the shears. However, wear surfaces according to the present invention are not limited to this arrangement. For example, a surface is a wear surface if is makes sliding or shearing contact with material being processed by the shears, even if the wear surface does not contact another surface of the shears, itself. Wear surfaces include any surface that is worn through moving contact with any other surface during normal operation of the shears.

A lubrication system according to the present invention may provide lubricant to any combination of one or more wear surfaces on a material processing shears. The wear surfaces may be shearing wear surfaces that slidingly engage the processed material (e.g., wear surfaces on lower blade insert members 114, 116 (FIG. 4); wear surfaces 510b, 512b on the upper blade insert members 510, 512 (FIG. 30); wear surfaces 502a, 502e that are adjacent to lower blade insert members (FIG. 29); wear surfaces 504b, 504d that are adjacent to upper blade insert members (FIG. 30); the lateral wear surface on the wear plate 320 (FIG. 22); the lateral wear surface of the guide blade 118 (FIG. 4)). Opposing shearing wear surfaces on the upper and lower jaws move past each other in a shearing relationship as the jaws close relative to each other. The opposing shearing wear surfaces may contact each other during this shearing motion or may remain spaced from each other to create a gap in which the processed material is sheared. These shearing wear surfaces may intermittently engage the processed material during operation of the shears.

The wear surfaces may alternatively or additionally be lateral stabilizing surfaces that discourage lateral deflection of the jaws relative to each other (e.g., the wear surface 176a on the lateral blade stabilizers 122, 124 (FIG. 11); the wear surface of the arcuate wear member 330 (FIG. 23); the wear surface 328 (FIG. 22); the lateral wear surface on the wear plate 320 (FIG. 22); the lateral wear surface of the guide blade 118 (FIG. 4)). The lateral stabilizing surfaces are preferably spaced from the pivotal connection between the jaws. In the illustrated embodiments, the shearing and lateral stabilizing wear surfaces are generally planar. However, the shearing and lateral stabilizing wear surfaces may alternatively have any other suitable shape without deviating from the scope of the present invention (e.g., convex, concave, curved, cylindrical, etc.).

In addition to or in the alternative to lubricating shearing or lateral stabilizing wear surfaces, a lubricating system according to the present invention may lubricate any other suitable wear surface of the shears. For example, the lubricating system may lubricate wear surfaces in the pivotal connection between the jaws (e.g., the cylindrical wear surface lubricated by the lubricant port 306a (FIG. 23)), the pivotal connection between the drive cylinder and the upper jaw (e.g., the cylindrical wear surface lubricated by the lubricant port 307a (FIG. 23), or the pivotal connection between the drive cylinder and the stick structure.

In the illustrated embodiments, the lubricant output conduit delivers lubricant directly to the lubricated wear surface(s) via closed fluid conduits. In an alterative embodiment of the present invention, the lubricant output conduit includes an open air passageway that extends between the lubricated wear surface(s) and a dispersion nozzle disposed on a portion of the shears that faces the lubricated wear surface(s). Operation of the lubricating system projects lubricant out of the nozzle, through the air, and onto the lubricated wear surface(s). The operation may be timed so as to occur when processed material will not interfere with the dispersion of lubricant (e.g., when the jaws are in their open position). Alternatively, lubrication application may be timed to coincide with the processing of material in the shears so as to simultaneously lubricate the wear surface(s) and the surfaces of the processed material that contact such wear surface(s) on the shears. The nozzle may be disposed near the pivotal connection between the jaws and may disperse lubricant sufficiently broadly that it lubricates wear surfaces on the upper and lower jaws.

According to an alternative embodiment of the present invention, the lubricant conduit includes a lubricant impregnated material such as a sponge, brush, etc. The lubricant impregnated material may be supplied with lubricant via a pump and reservoir as previously discussed. Alternatively, a user may manually apply lubricant to the material such that the material is saturated with enough lubricant to operate effectively for a reasonable amount of time before lubricant must be reapplied to the material. The lubricant impregnated material is positioned on the shears at a location that makes sliding contact with a wear surface(s) as the jaws open or close relative to each other. Lubricant is therefore applied to the wear surface by the material with each opening and closing of the shears.

The lubricant impregnated material may be disposed in a protected location on the shears so that operation of the shears and movement of processed material does not damage or interfere with the lubricant impregnated material. Alternatively, the lubricant impregnated material may be provided on a mechanized moving arm. The arm moves the lubricant impregnated material away from the jaws to a stowed position during operation of the shears. The arm subsequently moves the oil impregnated material into a lubricating position in which the lubricant impregnated material contacts the wear surface(s) when the shears are not processing material. Any suitable mechanism may be used to move the arm between the stowed and lubricating positions (e.g., telescopic movement, pivotal movement, compound movement). The arm may move the lubricant impregnated material between multiple lubricating positions so as to lubricate multiple wear surfaces.

According to an alternative embodiment of the present invention, the lubricant impregnated material is replaced by a lubricant spraying device (e.g., an aerosol spray can, a lubricant atomizer, a pneumatic lubricant sprayer, etc.).

With this arrangement, the various wear parts and wear surfaces can be automatically lubricated while a metal demolition shears is being operated. This may extend the service life of the various wear parts and increases productivity by eliminating the need to stop operation every time it is desired to lubricate the various wear parts. Lubrication may reduce noise during operation of the shears.

Although specific embodiments of the invention have been disclosed and described for illustrative purposes, various modifications to and departures from the disclosed embodiments will occur to those having skill in the art. Those and other such departures from the disclosed embodiments are deemed to be within the scope of the following claims.

What is claimed is:

1. A material processing system, comprising:
   a first jaw;
   a second jaw operatively connected to the first jaw;
   a powered actuator that enables relative movement between the first and second jaws;
   a first shearing wear portion disposed on one of the first and second jaws, the first shearing wear portion having a first shearing wear surface; and
   a lubricant conduit carried by the system, the lubricant conduit having a first end positioned to direct lubricant toward and on to the first shearing wear surface when lubricant flows out of the first end of the lubricant conduit.

2. The system of claim 1, wherein the first shearing wear surface is generally planar.

3. The system of claim 1, wherein the first shearing wear surface is configured to intermittently contact material being processed during operation of the material processing system.

4. The system of claim 1, further comprising a lubricant supply, the lubricant supply fluidly connecting to the lubricant conduit to provide lubricant to the first shearing wear surface.

5. The system of claim 4, wherein:
   the first shearing wear surface is disposed on the first jaw,
   the first end of the lubricant conduit moves relative to the first jaw when the first jaw moves relative to the second jaw, and
   the first end faces the first shearing wear surface.

6. The system of claim 4, wherein the powered actuator comprises a hydraulic cylinder pivotally connected to one of the jaws.

7. The system of claim 6, further comprising an excavator having a hydraulic system, wherein the first and second jaws are attached to the excavator, and wherein the hydraulic cylinder derives power from the hydraulic system.

8. The system of claim 4, wherein the first shearing wear portion comprises a blade on one of the jaws.

9. The system of claim 8, wherein the blade comprises a blade insert member removably mounted to the one of the jaws.

10. The system of claim 4, wherein the first end of the lubricant output conduit comprises a lubricant port disposed in the first shearing wear surface.

11. The system of claim 10, wherein the first shearing wear portion comprises a blade on one of the jaws.

12. The system of claim 11, wherein the blade comprises a blade insert member removably mounted to the one of the jaws.

13. The system of claim 12, further comprising a groove in the one of the jaws, wherein the blade insert member encloses the groove to form a fluid conduit, and wherein the fluid conduit defines a portion of the lubricant conduit.

14. The system of claim 4, further comprising a blade insert member removably mounted to the first jaw,
   wherein the blade insert member has a second shearing wear surface, and
   wherein the first shearing wear surface comprises a surface of the first jaw adjacent to the second wear surface.

15. The system of claim 14, wherein the first and second wear surfaces are generally coplanar to each other.

16. The system of claim 4, further comprising a second shearing wear portion having a second shearing wear surface, wherein the first and second shearing wear surfaces are configured to move relative to each other in a shearing relationship as the second jaw moves relative to the first jaw during operation of the system.

17. The system of claim 16, wherein the first and second shearing wear surfaces remain spaced from each other as they move by each other.

18. The system of claim 4, further comprising at least one additional wear surface disposed on the system, wherein the lubricant conduit includes a lubricant distributor valve that is configured to distribute lubricant to the first shearing wear surface and the at least one additional wear surface.

19. The system of claim 4, further comprising a second wear portion having a second wear surface,
wherein the first shearing wear portion is disposed on the first jaw,
wherein the second wear portion is disposed on the second jaw, and
wherein the lubricant conduit includes a second end, the second end being positioned to supply lubricant to the second wear surface.

20. The system of claim 4, further comprising a powered lubricant pump operatively connected to the lubricant conduit and the lubricant supply to pump lubricant from the lubricant supply to the first end of the lubricant conduit.

21. The system of claim 20, wherein the lubricant conduit includes a lubricant distributor valve,
wherein the system further comprises a second wear portion having a second wear surface,
wherein the lubricant conduit includes a second end that is positioned to supply lubricant to the second wear surface when lubricant flows through the second end of the lubricant conduit, and
wherein the lubricant distributor valve distributes lubricant from the pump to the first and second ends of the lubricant conduit.

22. The system of claim 21, wherein the first and second ends of the lubricant conduit are positioned to supply lubricant to different ones of: a portion of the operative connection between the first and second jaws, a portion of a movable connection between one of the jaws and the powered actuator, a lateral wear portion on one of the jaws that is configured to transfer lateral loads to a lateral blade stabilizer mounted to the other jaw, a blade on one of the jaws.

23. The system of claim 20, wherein:
the system comprises a shears body,
the first and second jaws are operatively connected to the body,
the lubricant pump is disposed within the body,
the powered actuator moves the first jaw relative to the body, and
the lubricant conduit extends from the pump into the first jaw.

24. The system of claim 4, wherein:
the first jaw comprises a piercing tip portion having a forward wear surface,
the second jaw comprises a forward cross-member having an inner wear surface that shearingly interacts with the forward wear surface, and
wherein the first shearing wear surface is defined by the inner wear surface.

25. The system of claim 4, wherein:
the first jaw comprises a piercing tip portion having a forward wear surface,
the second jaw comprises a forward cross-member having an inner wear surface that shearingly interacts with the forward wear surface, and
wherein the first shearing wear surface is defined by the forward wear surface.

26. The system of claim 4, wherein:
the first jaw comprises a piercing tip portion having a lateral wear surface,
the second jaw comprises a guide blade having an inner wear surface that shearingly interacts with the lateral wear surface, and
wherein the first shearing wear surface is defined by the lateral wear surface.

27. The system of claim 1, wherein the lubricant conduit is at least partially defined by the first jaw.

28. The system of claim 1, further comprising a removable blade insert member mounted to one of the first arid second jaws,
wherein the first shearing wear surface is disposed on the removable blade insert member, and
wherein the lubricant conduit is at least partially defined by the removable blade insert member.

29. The system of claim 1, wherein the lubricant conduit is defined at least in part by the first jaw.

30. A material processing system, comprising:
a first jaw;
a second jaw operatively connected to the first jaw;
a powered actuator that enables relative movement between the first and second jaws;
a first shearing wear portion disposed on one of the first and second jaws, the first shearing wear portion having a first shearing wear surface;
a lubricant conduit carried by the system, the lubricant conduit having a first end positioned to supply lubricant to the first shearing wear surface when lubricant flows out of the first end of the lubricant conduit; and
a lubricant supply, the lubricant supply fluidly connecting to the lubricant conduit to provide lubricant to the first shearing wear surface,
wherein the first shearing wear portion comprises a blade on one of the jaws, and
wherein the lubricant conduit is at least partially defined by the blade.

31. The system of claim 4, wherein the lubricant comprises grease.

32. A metal demolition shears, comprising:
a first jaw having a first cutting blade;
a second jaw having a second cutting blade, the first and second jaws being coupled for relative movement therebetween, the first and second cutting blades being positioned so as to shearingly interact with each other during relative movement of the first and second jaws into a closed position;
a powered actuator connected to the jaws for moving the jaws into their closed position;
a lubricant conduit carried at least in part by one of the jaws and having an outlet arranged to eject lubricant onto the first cutting blade; and
a lubricant pump operatively connected with the lubricant conduit for pumping the lubricant through the lubricant conduit for receipt by the first cutting blade.

33. The shears of claim 32, wherein the lubricant conduit is at least partially defined by one of the jaws.

34. The shears of claim 32, wherein:
the shears are constructed and arranged to be attached to an excavator having a hydraulic system; and
the powered actuator comprises a hydraulic cylinder constructed and arranged to derive power from the hydraulic system.

35. The shears of claim 32, wherein the lubricant pump moves with the second jaw relative to the first jaw as the jaws move into the closed position, and wherein the lubricant conduit is at least partially defined by the first jaw.

36. The shears of claim 32, wherein the lubricant pump is powered by the powered actuator.

37. A metal demolition shears, comprising:

a first jaw having a first cutting blade;

a second jaw having a second cutting blade, the first and second jaws being coupled for relative movement therebetween, the first and second cutting blades being positioned so as to shearingly interact with each other during relative movement of the first and second jaws into a closed position;

a powered actuator connected to the jaws for moving the jaws into their closed position;

a lubricant conduit carried at least in part by one of the jaws and having an outlet arranged to eject lubricant onto the first cutting blade; and a lubricant pump operatively connected with the lubricant conduit for pumping the lubricant through the lubricant conduit for receipt by the first cutting blade, wherein the lubricant conduit is at least partially defined by the first cutting blade.

38. The shears of claim 37, wherein the first jaw comprises a removable first blade insert member that defines the first cutting blade such that the lubricant conduit is at least partially defined by the first blade insert member.

39. A material processing shears, comprising:

a first jaw having a cutting blade that has a shearing wear surface;

a second jaw connected to the first jaw for relative movement between open and closed positions;

a hydraulic cylinder connected to the jaws for moving the jaws between their open and closed positions;

a lubricant conduit carried at least in part by the first jaw and having an outlet arranged to eject lubricant onto the shearing wear surface, wherein the lubricant conduit is defined at least in part by the first jaw.

40. The shears of claim 39, wherein the lubricant conduit has a lubricant outlet formed in the shearing wear surface.

41. The shears of claim 39, further comprising a removable blade insert member mounted to one of the first and second jaws, wherein the cutting blade is disposed on the removable blade insert member, wherein the shearing wear surface is disposed on the removable blade insert member, and wherein the lubricant conduit is at least partially defined by the removable blade insert member.

42. A material processing system, comprising:

a first jaw;

a second jaw operatively connected to the first jaw;

a powered actuator that enables relative movement between the first and second jaws;

a first shearing wear portion disposed on one of the first and second jaws, the first shearing wear portion having a first shearing wear surface; and a lubricant conduit carried by the system, the lubricant conduit having a first end positioned to direct lubricant toward the first shearing wear surface when lubricant flows out of the first end of the lubricant conduit, wherein the first end of the lubricant output conduit comprises a lubricant port disposed in the first shearing wear surface.

\* \* \* \* \*